United States Patent
Meine

(10) Patent No.: US 11,572,690 B2
(45) Date of Patent: *Feb. 7, 2023

(54) STRUCTURAL ATTACHMENT SEALING SYSTEM

(71) Applicant: Unirac Inc., Albuquerque, NM (US)

(72) Inventor: Shawn J. Meine, Phoenix, AZ (US)

(73) Assignee: Unirac Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/315,215

(22) Filed: May 7, 2021

(65) Prior Publication Data

US 2021/0262222 A1 Aug. 26, 2021

Related U.S. Application Data

(63) Continuation of application No. 17/220,730, filed on Apr. 1, 2021, which is a continuation of application
(Continued)

(51) Int. Cl.
| | |
|---|---|
| *E04B 1/68* | (2006.01) |
| *H02S 20/23* | (2014.01) |
| *E04D 13/143* | (2006.01) |
| *F16B 43/00* | (2006.01) |
| *F16B 9/00* | (2006.01) |

(Continued)

(52) U.S. Cl.
CPC .......... *E04B 1/6801* (2013.01); *E04D 13/143* (2013.01); *F16B 9/05* (2018.08); *F16B 33/004* (2013.01); *F16B 43/001* (2013.01); *F24S 10/00* (2018.05); *H02S 20/23* (2014.12)

(58) Field of Classification Search
CPC ...... E04B 1/6801; E04D 13/143; F24S 10/00; F16B 9/05; F16B 33/004; F16B 43/001; H02S 20/23
See application file for complete search history.

(56) References Cited

U.S. PATENT DOCUMENTS

| | | | |
|---|---|---|---|
| 4,026,183 A | 5/1977 | Bart | |
| 4,112,693 A | 9/1978 | Collin et al. | |

(Continued)

FOREIGN PATENT DOCUMENTS

| | | |
|---|---|---|
| DE | 4416884 A1 | 11/1995 |
| EP | 2006465 A3 | 4/2009 |

OTHER PUBLICATIONS

Office Action for U.S. Appl. No. 16/204,334 dated Jan. 31, 2020, Shawn Meine, "Structural Attachment Sealing System", 8 pages.

(Continued)

*Primary Examiner* — Beth A Stephan
(74) *Attorney, Agent, or Firm* — Lee & Hayes, P.C.

(57) ABSTRACT

A mounting device includes a base having an internal cavity, a top, and an open bottom in communication with the internal cavity. The device includes a first upper member above the base, wherein the first upper member extends upwardly from the base, and a second upper member is above the base, wherein the second upper member extends upwardly from the base. The device further includes a fastener opening formed though the base for receiving a fastener when the mounting device is secured to a roof. The fastener opening is in communication with the internal cavity.

32 Claims, 30 Drawing Sheets

Related U.S. Application Data

No. 16/994,582, filed on Aug. 15, 2020, now Pat. No. 10,982,430, which is a continuation of application No. 16/204,334, filed on Nov. 29, 2018, now Pat. No. 10,781,587, which is a continuation-in-part of application No. 15/840,430, filed on Dec. 13, 2017, now Pat. No. 10,171,026, application No. 17/315,215, filed on May 7, 2021, which is a continuation of application No. 17/203,662, filed on Mar. 16, 2021, which is a continuation of application No. 16/994,582, filed on Aug. 15, 2020, now Pat. No. 10,982,430.

(60) Provisional application No. 62/433,953, filed on Dec. 14, 2016.

(51) Int. Cl.
*F16B 33/00* (2006.01)
*F24S 10/00* (2018.01)

(56) References Cited

U.S. PATENT DOCUMENTS

| | | |
|---|---|---|
| D263,678 S | 4/1982 | Dewey |
| D263,927 S | 4/1982 | Dewey |
| D263,928 S | 4/1982 | Dewey |
| 4,361,997 A | 12/1982 | DeCaro |
| 4,371,293 A | 2/1983 | Wilcox et al. |
| 4,455,804 A | 6/1984 | Francovitch |
| 4,476,660 A | 10/1984 | Francovitch |
| 4,502,256 A | 3/1985 | Hahn |
| 4,520,606 A | 6/1985 | Francovitch |
| 4,574,551 A | 3/1986 | Giannuzzi |
| 4,619,094 A | 10/1986 | Yang |
| 4,620,402 A | 11/1986 | Beneze |
| 4,624,092 A | 11/1986 | Baginski |
| 4,630,422 A | 12/1986 | Beneze |
| 4,631,433 A | 12/1986 | Stokes |
| 4,631,887 A | 12/1986 | Francovitch |
| 4,658,558 A | 4/1987 | Verble |
| 4,686,808 A | 8/1987 | Triplett |
| 4,715,756 A | 12/1987 | Danico et al. |
| 4,726,164 A | 2/1988 | Reinwall et al. |
| 4,727,699 A | 3/1988 | Sargent |
| 4,744,187 A | 5/1988 | Tripp |
| 4,757,662 A | 7/1988 | Gasser |
| 4,763,456 A | 8/1988 | Giannuzzi |
| 4,787,188 A | 11/1988 | Murphy |
| 4,788,807 A | 12/1988 | Whitman |
| 4,799,845 A | 1/1989 | Hrysko |
| 4,860,513 A | 8/1989 | Whitman |
| 4,860,514 A | 8/1989 | Kelly |
| 4,890,968 A | 1/1990 | Beach et al. |
| 4,943,100 A | 7/1990 | Emberson |
| 4,945,699 A | 8/1990 | Murphy |
| 4,959,938 A | 10/1990 | Caro |
| 4,989,911 A | 2/1991 | Order |
| 4,999,963 A | 3/1991 | Verble |
| 5,018,329 A | 5/1991 | Hasan et al. |
| 5,018,748 A | 5/1991 | Schalle |
| 5,056,853 A | 10/1991 | Order |
| 5,069,589 A | 12/1991 | Lemke |
| 5,094,056 A | 3/1992 | Peters |
| 5,100,274 A | 3/1992 | Hasan et al. |
| 5,139,379 A | 8/1992 | Hasan et al. |
| 5,217,339 A | 6/1993 | O'Connor et al. |
| 5,407,313 A | 4/1995 | Bruins et al. |
| 5,419,666 A | 5/1995 | Best |
| 5,557,897 A | 9/1996 | Kranz et al. |
| 5,562,380 A | 10/1996 | Hempfling et al. |
| 5,628,587 A | 5/1997 | Lesslie |
| 5,797,232 A | 8/1998 | Larson |
| 5,803,693 A | 9/1998 | Choiniere et al. |
| 5,908,278 A | 6/1999 | Hasan et al. |
| 5,915,903 A | 6/1999 | Osterle et al. |
| 5,930,969 A | 8/1999 | Mayle et al. |
| 5,934,855 A | 8/1999 | Osterle et al. |
| 6,035,595 A | 3/2000 | Anderson |
| 6,205,730 B1 | 3/2001 | Hasan et al. |
| 6,233,889 B1 | 5/2001 | Hulsey |
| 6,250,034 B1 | 6/2001 | Hulsey |
| D446,319 S | 8/2001 | Rubenacker |
| 6,282,857 B1 | 9/2001 | Rubenacker |
| 6,938,385 B2 | 9/2005 | Lind |
| 8,282,108 B2 | 10/2012 | Teng |
| 8,302,363 B1 | 11/2012 | Johnson |
| 8,341,895 B2 | 1/2013 | Schwarze et al. |
| 8,448,407 B1 | 5/2013 | Wiener |
| 8,875,455 B1 | 11/2014 | Yang et al. |
| 8,938,932 B1 * | 1/2015 | Wentworth ............. F24S 25/61 52/173.3 |
| 8,984,819 B1 | 3/2015 | Yang et al. |
| 9,080,792 B2 | 7/2015 | Patton et al. |
| 9,134,044 B2 | 9/2015 | Stearns et al. |
| 9,447,988 B2 | 9/2016 | Stearns et al. |
| 9,496,820 B2 | 11/2016 | Seery et al. |
| 9,874,021 B2 | 1/2018 | Hudson et al. |
| 10,148,217 B2 | 12/2018 | Meine |
| 10,171,026 B2 | 1/2019 | Meine |
| 10,767,684 B1 | 9/2020 | Meine et al. |
| 10,982,430 B2 | 4/2021 | Meine |
| 11,313,591 B1 * | 4/2022 | Atia ..................... H02S 20/23 |
| 2002/0066235 A1 | 6/2002 | Stearns et al. |
| 2002/0108315 A1 | 8/2002 | Wasitis et al. |
| 2003/0033780 A1 | 2/2003 | Hasan |
| 2003/0033783 A1 | 2/2003 | Kobetsky |
| 2004/0040243 A1 | 3/2004 | Yaros |
| 2004/0115010 A1 | 6/2004 | Robertson et al. |
| 2004/0148888 A1 | 8/2004 | Kuhn et al. |
| 2004/0170489 A1 | 9/2004 | Nebesnak et al. |
| 2005/0121902 A1 | 6/2005 | Hull et al. |
| 2005/0166503 A1 | 8/2005 | Panasik |
| 2005/0183261 A1 | 8/2005 | Nebesnak et al. |
| 2006/0185289 A1 | 8/2006 | Gong et al. |
| 2007/0137126 A1 | 6/2007 | Sommerhein |
| 2008/0178556 A1 | 7/2008 | Meeks |
| 2009/0173028 A1 | 7/2009 | Garrigus et al. |
| 2010/0132305 A1 | 6/2010 | Heckeroth et al. |
| 2010/0326006 A1 | 12/2010 | Yaros |
| 2011/0094652 A1 | 4/2011 | Duvekot et al. |
| 2011/0227298 A1 | 9/2011 | Teng |
| 2012/0228863 A1 | 9/2012 | Coleman |
| 2012/0233958 A1 | 9/2012 | Stearns |
| 2013/0009025 A1 | 1/2013 | Stearns |
| 2013/0074441 A1 | 3/2013 | Stearns |
| 2013/0298494 A1 | 11/2013 | Corsi |
| 2014/0331594 A1 | 11/2014 | Stearns et al. |
| 2015/0176434 A1 | 6/2015 | Gerendés et al. |
| 2015/0244308 A1 | 8/2015 | Patton et al. |
| 2016/0134230 A1 | 5/2016 | Meine et al. |
| 2016/0248367 A1 | 8/2016 | Almy et al. |
| 2016/0248369 A1 | 8/2016 | Almy |
| 2016/0268957 A1 | 9/2016 | Liptak |
| 2017/0063300 A1 | 3/2017 | Ash |
| 2017/0108165 A1 | 4/2017 | Svec |
| 2017/0279403 A1 | 9/2017 | Seery et al. |
| 2017/0302222 A1 | 10/2017 | Aliabadi et al. |
| 2018/0062560 A1 | 3/2018 | Stephan et al. |
| 2018/0062571 A1 | 3/2018 | Ash et al. |
| 2019/0093340 A1 | 3/2019 | Meine |
| 2019/0145453 A1 | 5/2019 | Donald et al. |

OTHER PUBLICATIONS

Office Action for U.S. Appl. No. 16/994,582 dated Dec. 4, 2020, Shawn Meine, "Structural Attachment Sealing System", 14 pages.
Office Action for U.S. Appl. No. 15/875,021 dated Apr. 4, 2018, Shawn Meine, Structural Attachment Sealing System:, 7 pages.
Office Action for U.S. Appl. No. 15/840,430, dated Aug. 14, 2018, Shawn Meine, "Structural Attachment Sealing System", 8 pages.

(56) References Cited

OTHER PUBLICATIONS

Office Action for U.S. Appl. No. 17/220,730, dated May 13, 2022, Meine, "Structural Attachment Sealing System", 8 pages.

* cited by examiner

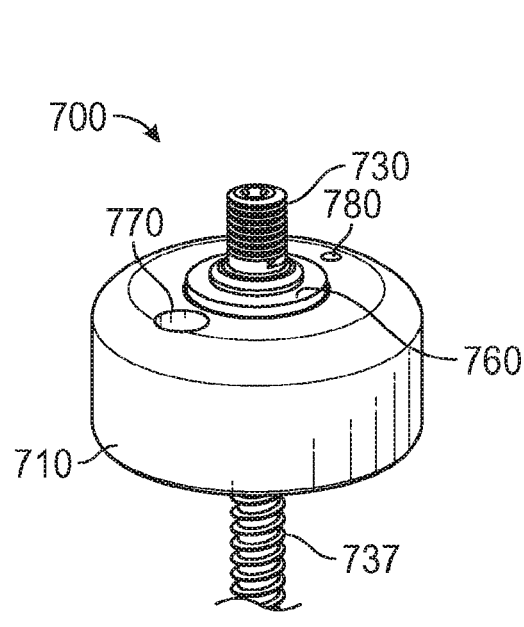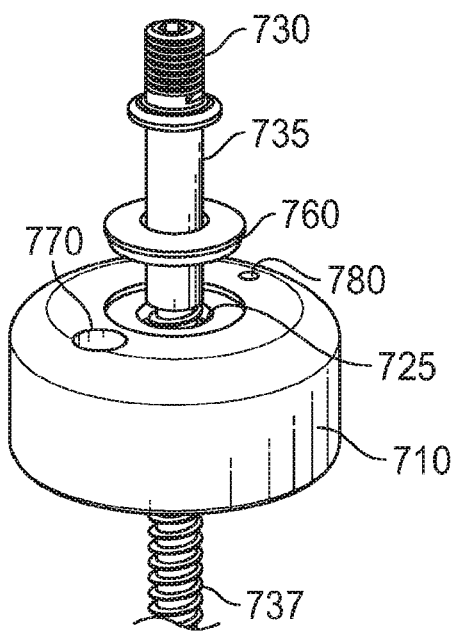
FIG. 14    FIG. 15
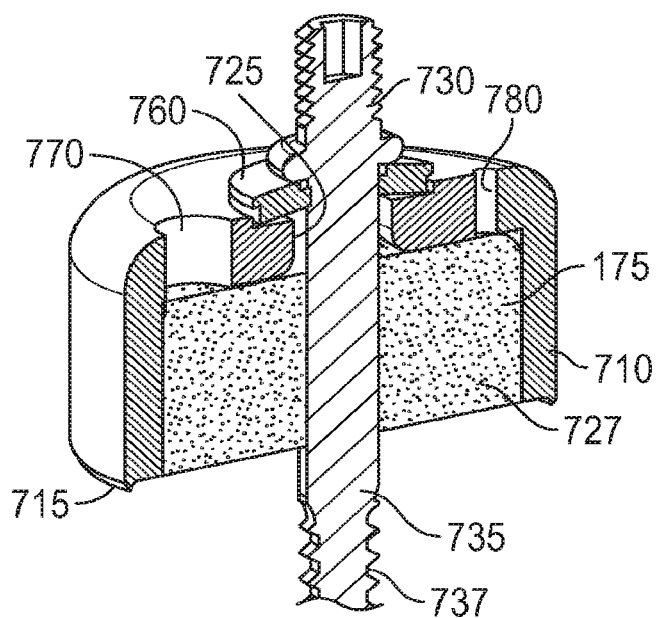
FIG. 16

STRUCTURAL ATTACHMENT SEALING SYSTEM

CROSS-REFERENCE TO RELATED APPLICATIONS

This application is a continuation of and claims the benefit of prior U.S. patent application No. 17/220,730, filed Apr. 1, 2021, which is a continuation of and claims the benefit of prior U.S. patent application Ser. No. 16/994,582, filed Aug. 15, 2020, which is a continuation of and claims the benefit of prior U.S. patent application Ser. No. 16/204,334, filed Nov. 29, 2018, which is a continuation-in-part of and claims the benefit of prior U.S. patent application Ser. No. 15/840,430, filed Dec. 13, 2017, which claims the benefit of U.S. Provisional Application No. 62/433,953, filed Dec. 14, 2016, all of which are hereby incorporated by reference. This application is also a continuation of and claims the benefit of prior U.S. patent application Ser. No. 17/203,662, filed Mar. 16, 2021, which is a continuation of and claims the benefit of U.S. patent application Ser. No. 16/994,582, filed Aug. 15, 2020, both of which are hereby incorporated by reference.

FIELD

More specifically, the invention relates to providing the system for sealing structural attachments for solar panel mounts for rail guides.

SUMMARY

A system utilizes an adhesive sealant to create a permanent watertight seal at any surface penetration. The system may be used for any structural attachment, fastener, mount, or other penetration that requires sealing. Typical building applications include roof penetrations and wall penetrations for cases such as roof vents, structural attachment, conduit or pipe penetrations, or electrical mounts to name a few.

The system allows the user to fasten or place any attachment over the penetration point. Sealant is then injected under pressure using, by way of example, a sealant dispenser gun, into an enclosed cavity around the penetration. The force from the sealant dispenser gun increases the pressure inside the enclosed cavity and forces all the air out through a vent hole. This ensures that the sealant completely fills all the voids and removes the air inside the enclosed cavity around the penetration. Variations of the preferred embodiment are also provided.

The system creates a permanent airtight and watertight seal that does more than just shed water around the attachment. The system also eliminates the need for standard flashing and assemblies, which may reduce installation costs. The system also eliminates the need to break the manufacturer's seal on the leading edge of roof shingles and eliminates the risk of removing nails on upper courses of shingles, which creates additional penetrations in the roof thereby making the structure more vulnerable to leaks.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings:

FIG. 14 illustrates a front perspective view of an exemplary flush mount attachment;

FIG. 15 illustrates an exploded front perspective view of the flush mount attachment;

FIG. 16 illustrates a cross-sectional view of the flush mount attachment;

DETAILED DESCRIPTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed. More generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1:
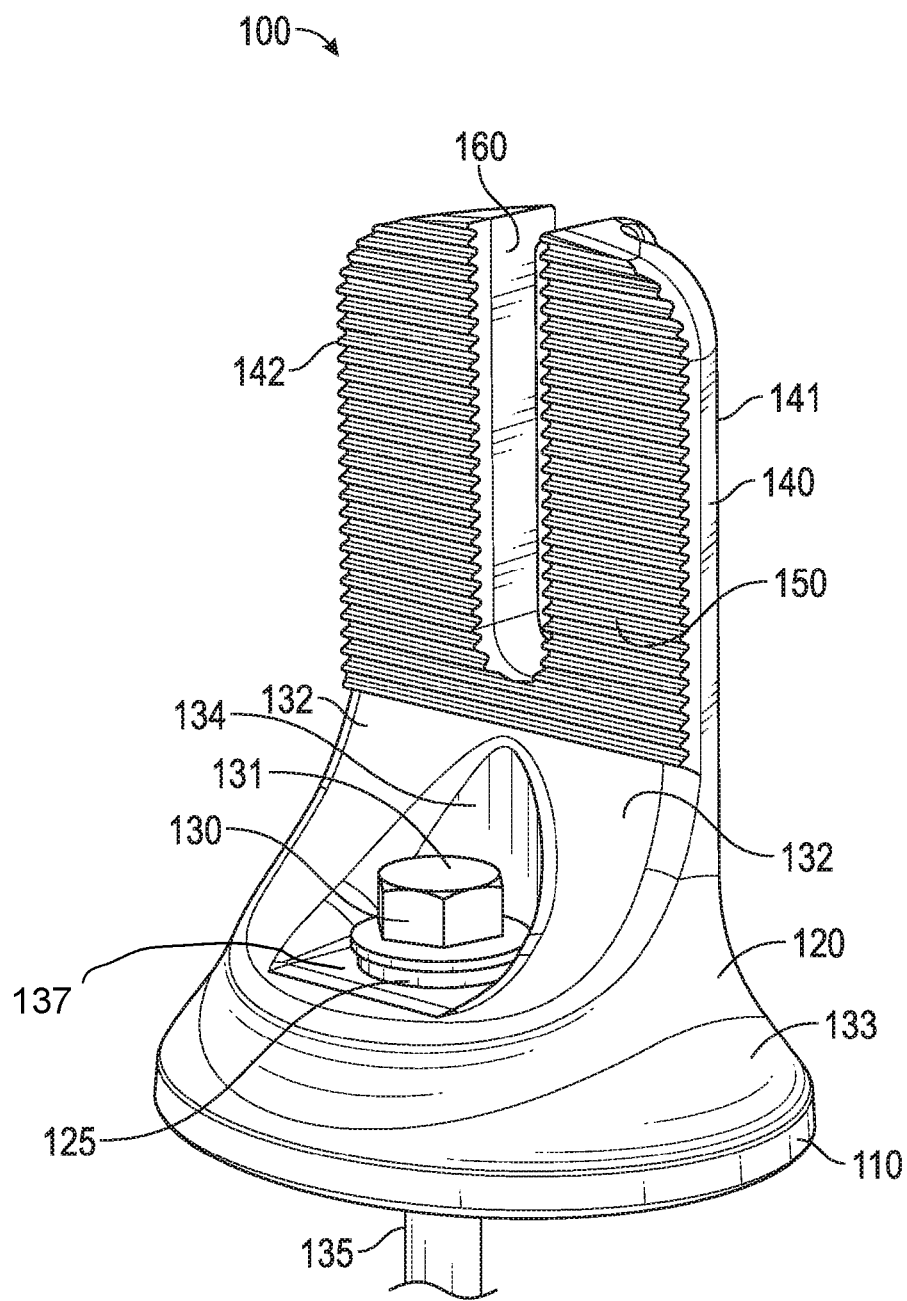
FIG. 1 illustrates a front perspective view of an exemplary attachment mount.
Figure 2:
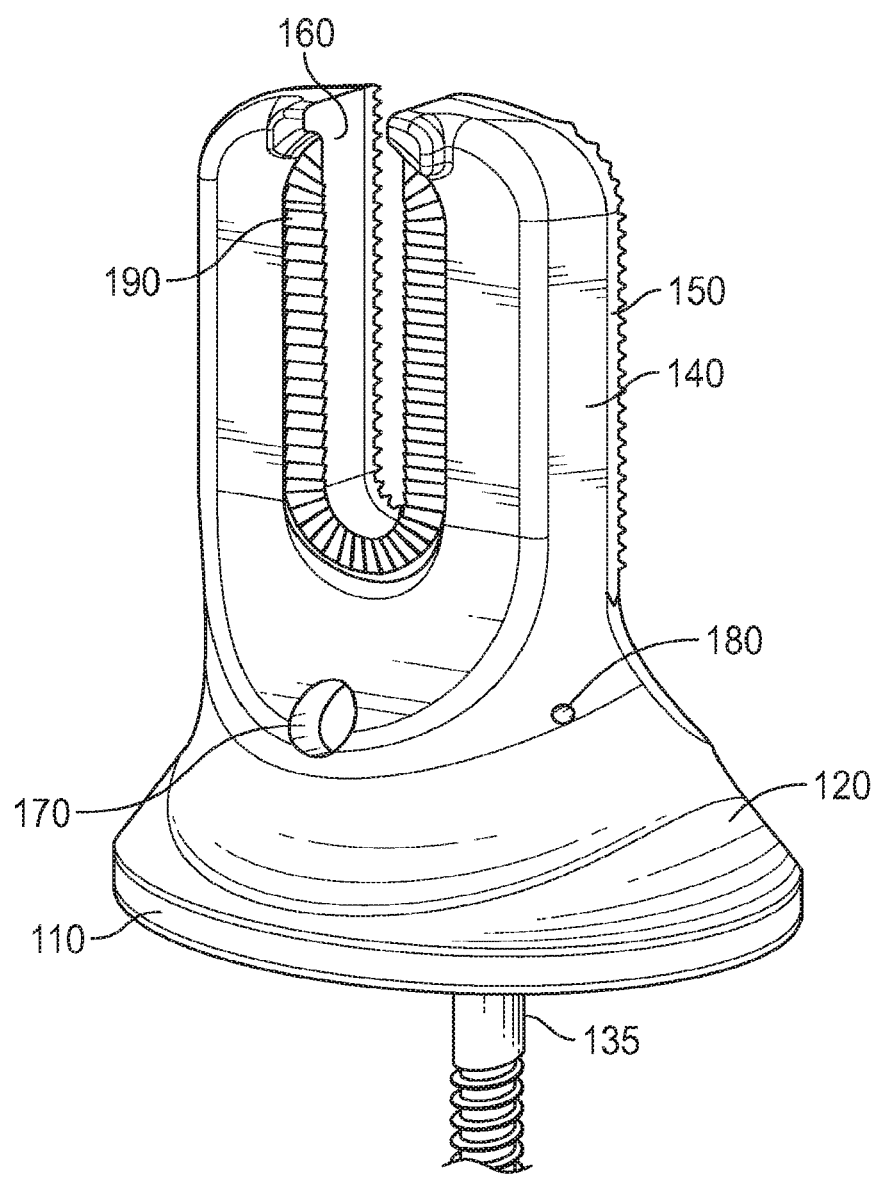
FIG. 2 illustrates a rear perspective view of the attachment mount of FIG. 1.

An exemplary embodiment of an attachment for sealing structural attachments for solar panel mounts for rail guides is shown in FIG. 1 in the form of a flush-type mount 100. FIG. 1 illustrates the front side of the flush-type mount 100 includes a lower portion 120 that includes a base 110 that is typically mounted and conforms to a top surface of a structure such as a roof 200 shown in FIG. 4. Throughout this description, the term "roof" can also mean "structure." The base 110 is rounded in this embodiment, but as with other alternate exemplary embodiments shown below, the shape of the base 110 can be any suitable form. The front side of the lower portion 120 tapers upward and forms a generally first concave section 132 and as shown in FIG. 2, the rear side tapers upward and forms a generally second concave section 136. Each of these concave sections 132 and 136 define the bottom of an upper portion of the mount 100, and are contiguous with a generally convex section 133. These concave and convex sections enable the apparatus to dispel water away from the base and create a volume to form the internal cavity. The first concave section 132 also forms an external cavity 134, which includes a base or seat 137 and an opening 125 through the seat 137 for receiving a bolt 130. The bolt 130 typically comprises a nut or head 131 for tightening the bolt 130 to secure the flush-type mount 100 to the roof 200 by penetrating a shaft 135 into an opening or pilot hole 210 on the roof 200 so that the head of the bolt resides on the seat 137. A generally U-shaped guide 140, which includes a pair of vertical members 141 and 142 that are contiguous with the internal cavity, extends upward contiguously from the concave sections 132 and 136 and the convex section 133 of the lower portion 120. The lower portion 120 tapers upward and forms this U-shaped guide 140, and the vertical members 141 and 142 form an aperture 160. Each of the members 141 and 142 on the guide 140 also includes a ridged surface 150. The aperture 160 is configured to receive a bolt that in turn is used to secure a mounting rail (not shown) to the ridged surface 150, which provides friction to assist the connection.

Figure 3:
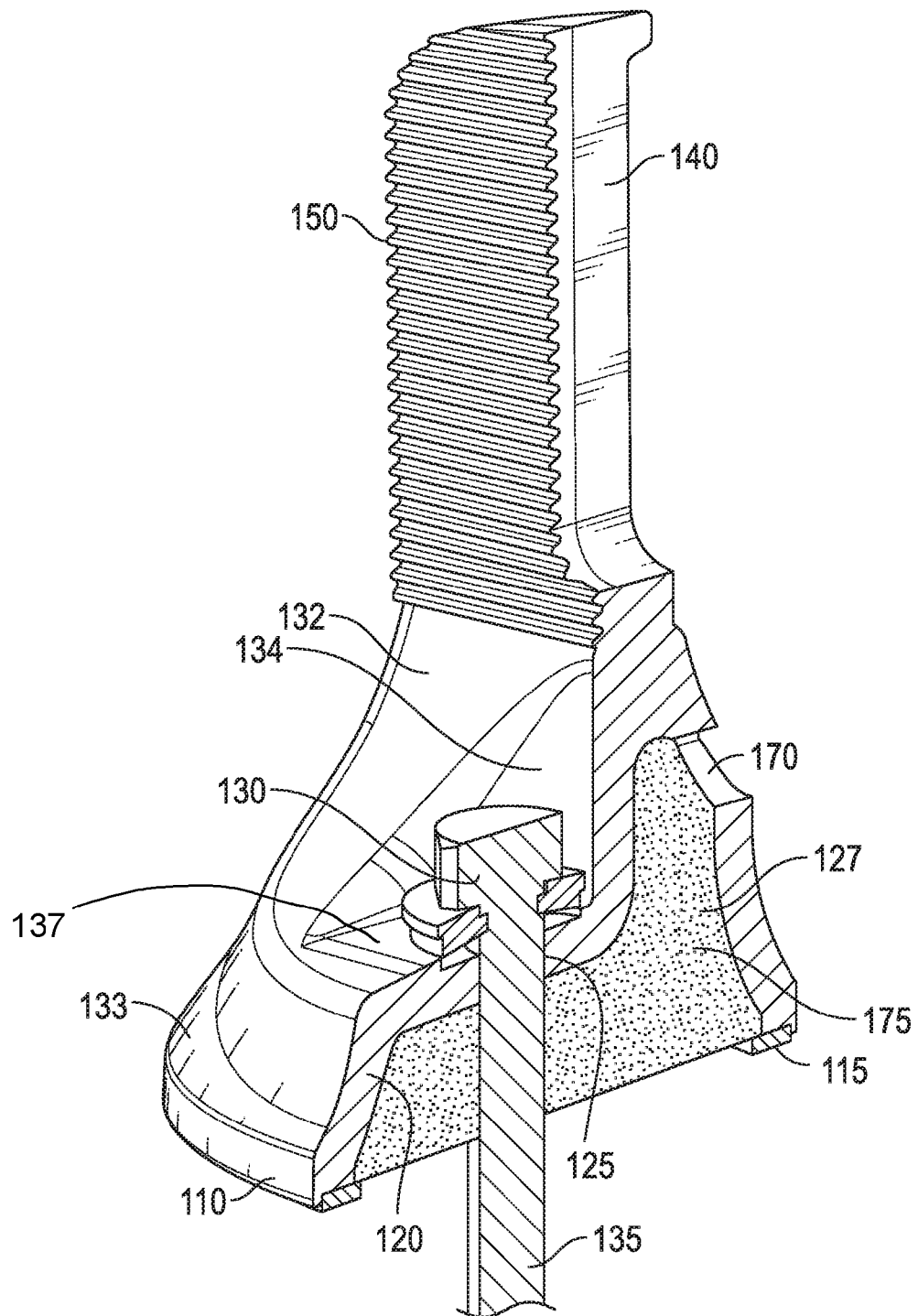
FIG. 3 illustrates a cross-sectional view of the front perspective view of FIG. 1.
Figure 6:
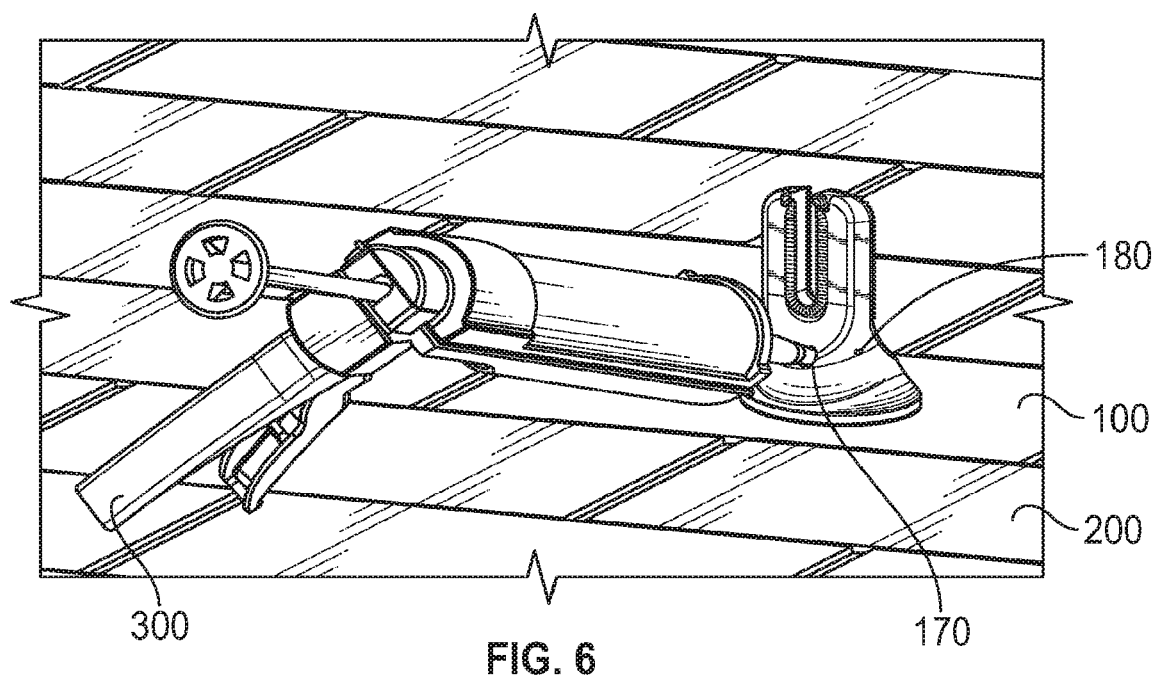
FIG. 6 illustrates a perspective view of a standard sealant gun applying sealant into a port hole on the attachment mount.

FIG. 2 illustrates the rear side of the flush-type mount 100. The lower portion 120 includes a port 170 and a vent 180. It is understood that the port 170 and the vent 180 can be located anywhere on the lower portion 120. FIG. 3, which illustrates a cross-sectional view of the flush mount 100, shows that the port hole 170 and the vent 180 provide access to a cavity 127. The cavity 127 provides a reservoir for sealant 175 that is injected into the port 170 by way, for example, of a sealant gun 300 as shown in FIG. 6. An optional seal 115 is provided along the perimeter of the base 110, and the bottom of the cavity 127 typically should cover the entire surface area within the base 110 and the optional seal 115. The vent 180 enables excess air inside the cavity 127 to be released as sealant 175 is injected into the cavity 127 so that the sealant 175 can cover the full surface area along the base 110 and seal the flush-type mount 100 to the surface of the roof 200 to prevent any liquid from leaking into the roof 200 where the flush-type mount 100 is secured.

Figure 4:
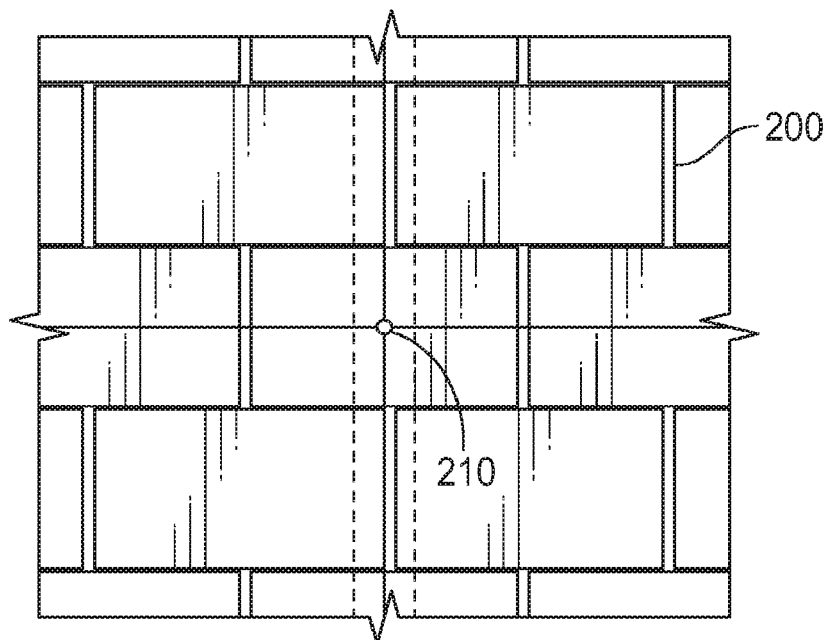
FIG. 4 illustrates a top view of a standard shingle roof.
Figure 5:
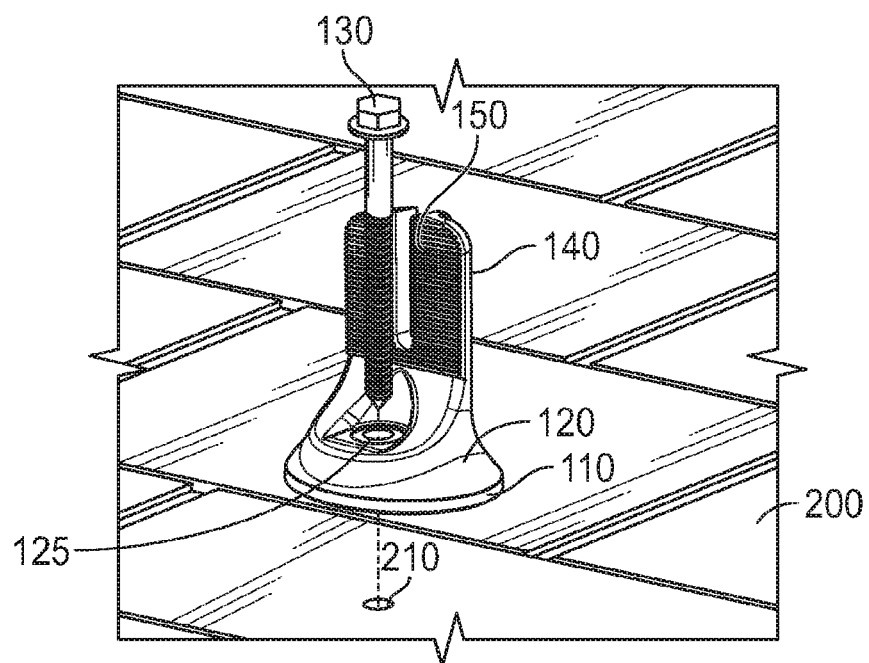
FIG. 5 illustrates an exploded view of the attachment mount secured to the roof of FIG. 4.

FIGS. 4-6 illustrate the steps of installing the flush-type mount 100 to the roof 200. FIG. 4 shows a top view of the roof 200. The first step in installing the system is to bore a pilot hole 210, typically with a drill, into a roof shingle on the roof 200 and fill it with sealant 175. FIG. 5 shows an exploded view of the flush-type mount 100 being installed. The next step is to place the mount 100 over the pilot hole 210 and secure the mount 100 by inserting the bolt 130 into the opening 125 and tightening it by rotating the nut 131 until the shaft 135 is fully inserted into the pilot hole 210. Once secured, as shown in FIG. 6, the sealant gun 300 is used to inject sealant 175 into the port hole 170. The cavity 127 is filled with sealant 175 until the sealant 175 begins to escape out of the vent 180 on the mount 100. When the sealant 175 begins to escape, it provides visual notice that the cavity 127 has been filled with sealant 175, thereby sealing the mount 100 to the roof 200.

Figure 7:
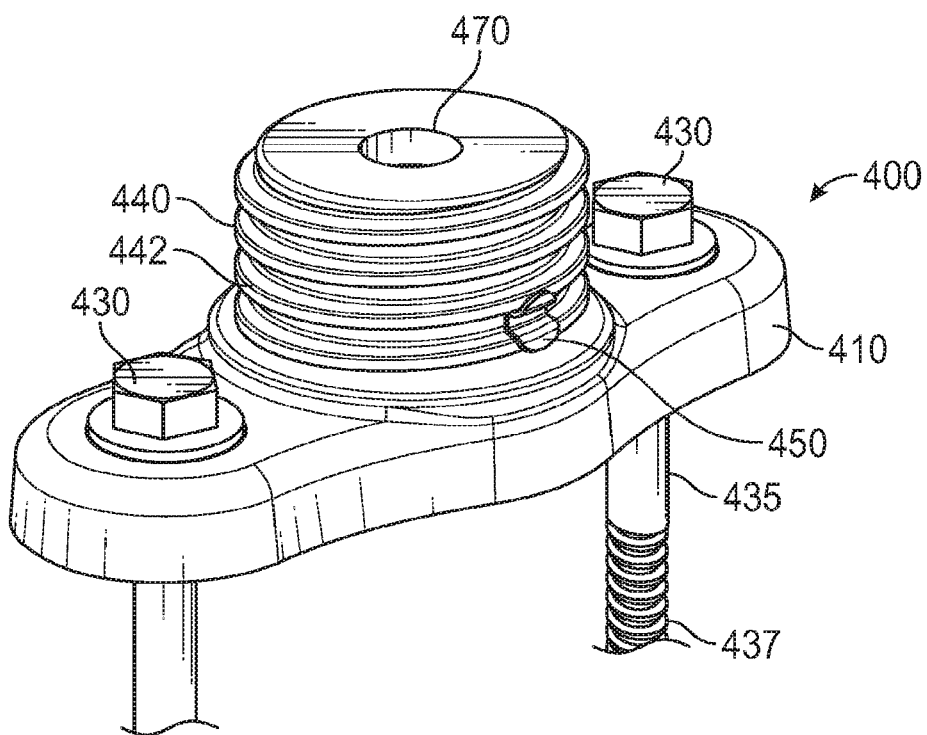
FIG. 7 illustrates a perspective view of an alternate embodiment of the attachment mount of FIG. 1 in the form of a standoff-type attachment.
Figure 11:
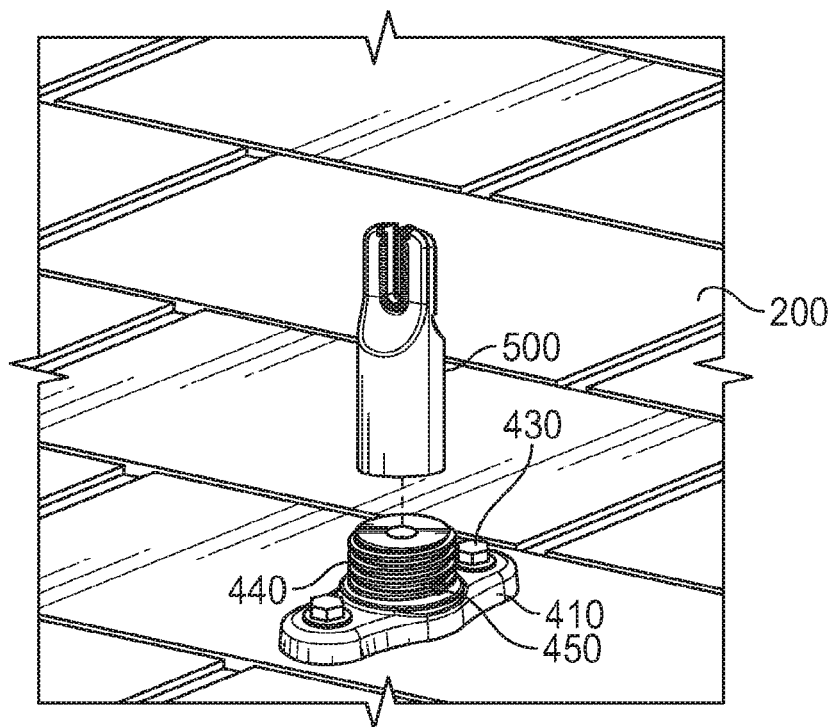
FIG. 11 illustrates an exploded view of a mount with the standoff-type attachment mount.

This form of securing and sealing attachment mounts is also provided in various alternate embodiments. One exemplary embodiment is a standoff-type attachment/mount 400 as shown in FIG. 7. The standoff-type 400 includes a base 410 and a pair of openings 425 (shown in FIG. 8) on opposite sides of the base 410 for bolts 430 to secure the standoff-type mount 400 to the roof 200. Each bolt 430 also has a shaft 435 extending downward and a threaded portion 437 on the shaft 435. The standoff-type mount 400 includes a support 440 with a port hole 470 and outer threads 442 that are used to receive an attachment 500 as shown in FIG. 11. The support 440 and base 410 form a hollow cavity 427 that is accessible by the port hole 470. An optional thread patch 450 is also included that assists in restricting the movement of the attachment 500 when it is rotated onto the support 440.

Figure 8:
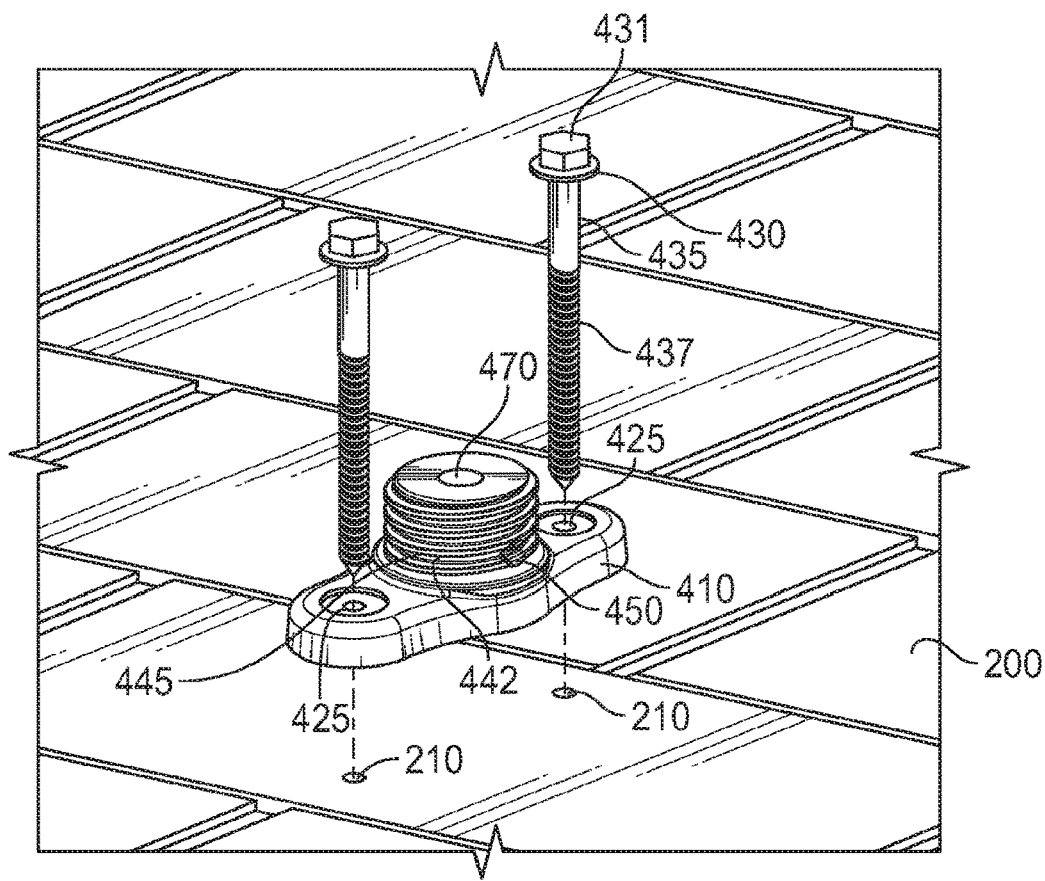
FIG. 8 illustrates an exploded perspective view of the standoff-type attachment mount being secured to the roof of FIG. 4.
Figure 9:
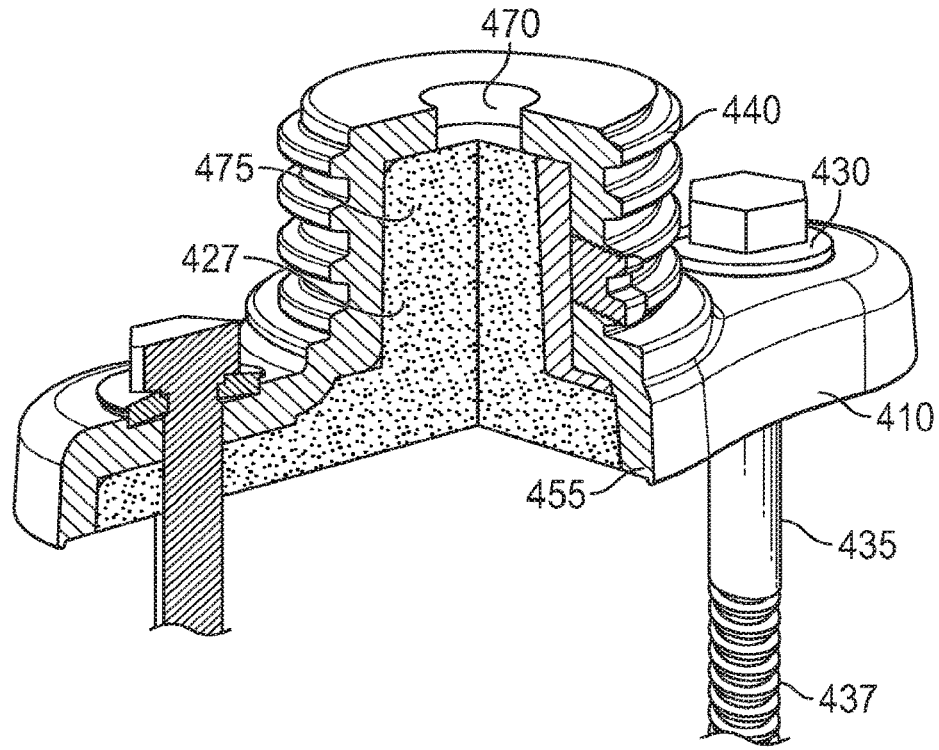
FIG. 9 illustrates a cross-sectional perspective view of the standoff-type attachment mount.

FIGS. 8-11 illustrate the steps of installing the standoff-type mount 400 to the roof 200. Like with the flush-type mount 100, the first step in installing the system is to bore pilot holes 210, typically with a drill, into a roof shingle on the roof 200 and fill it with sealant 175. FIG. 8 shows an exploded view of the standoff-type mount 400 being installed. The next step is to place the mount 400 over the pilot holes 210 and secure the mount 400 by inserting the bolts 430 into the openings 425 and tightening each bolt 430 by rotating the nut 431 until the shaft 435 is fully inserted into the pilot hole 210. FIG. 9 illustrates further details of the standoff-type mount 400. An optional sealing lip 455 that surrounds the inner surface of the cavity 427 is shown.

Figure 10:
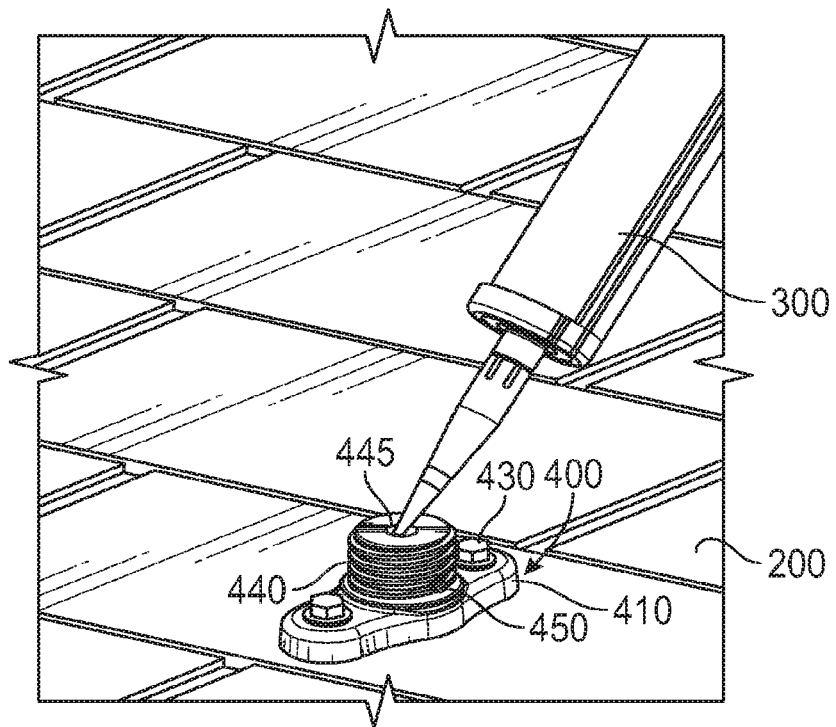
FIG. 10 illustrates a perspective view of the sealant gun applying sealant to a port hole in the standoff-type attachment mount.

Once secured, as shown in FIG. 10, the sealant gun 300 is used to inject sealant 175 into the port hole 470. In this embodiment, the port hole 470 can act both as a port hole 470 and a vent. The cavity 427 is filled with sealant 175 until the sealant 175 begins to escape out of the port hole 470 on the mount 400. When the sealant 175 begins to escape, it provides visual notice that the cavity 427 has been filled with sealant 175, thereby sealing the mount 400 to the roof 200. As shown in FIG. 11, once the mount 400 has been sealed to the roof 200, the attachment 500 can be coupled to the support 440, typically by rotating it along the threaded portion 437 until it is fully tightened.

Figure 12:
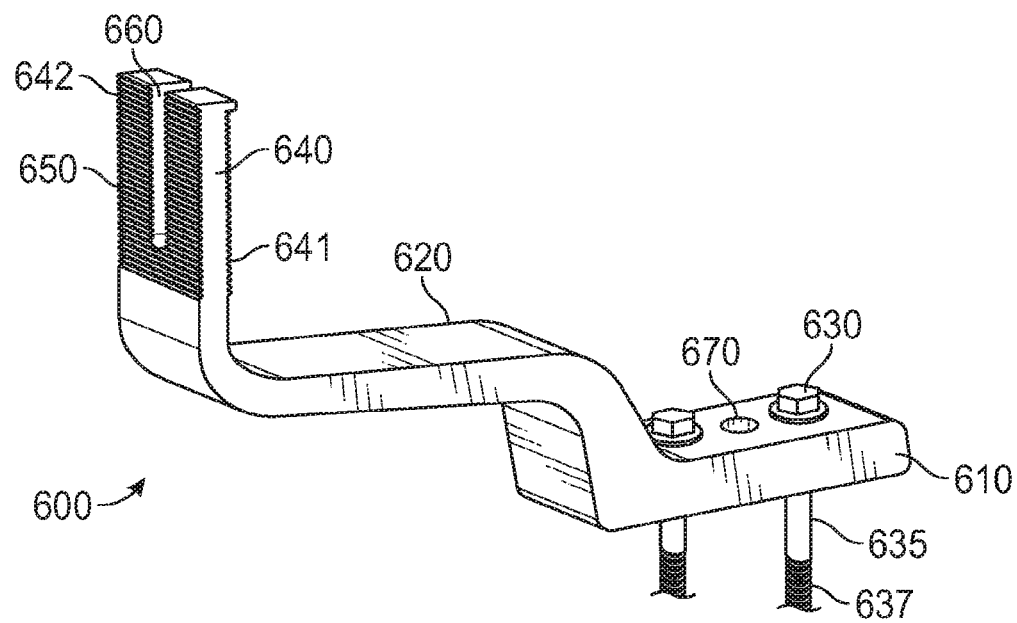
FIG. 12 illustrates a front perspective view of an exemplary tile-hook attachment mount.
Figure 13:
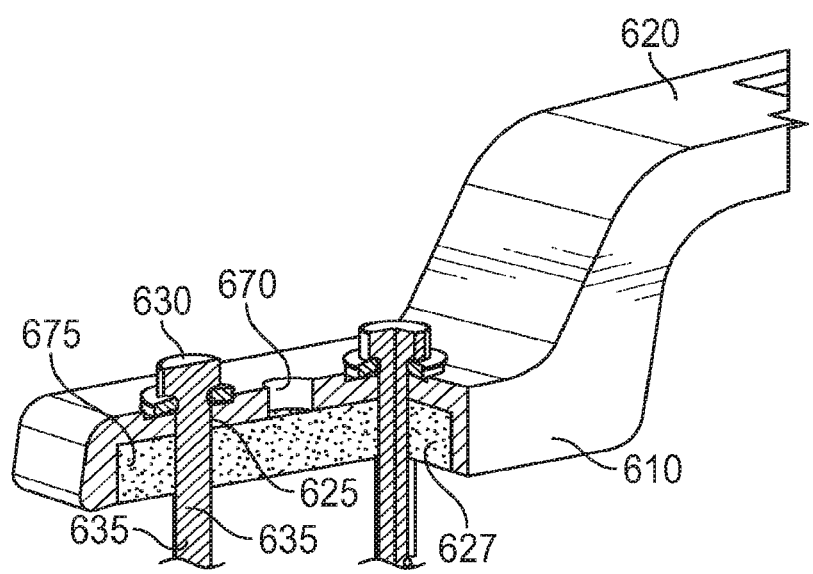
FIG. 13 illustrates a cross-sectional view of the rear of the tile-hook attachment mount.

Another exemplary embodiment is a tile-hook attachment/mount 600 as shown in FIGS. 12 and 13. The tile-hook mount 600 includes a base 610 and a pair of openings 625 (shown in FIG. 13) on opposite sides of the base 610 for bolts 630 to secure the tile-hook mount 600 to the roof 200. Each bolt 630 also has a shaft 635 extending downward and a threaded portion 637 on the shaft 635. The tile-hook mount 600 includes an attachment mount 620 with a lower portion that extends from the base 610 in a general L-shape. The upper portion of the attachment mount 620 forms an apparatus similar to that shown in the flush-type mount 100 with a generally U-shaped guide 640 that comprises a pair of members 641 and 642 extending from opposing sides of the upper portion of the attachment mount 620, which in turn forms an aperture 660. Each of the members 641 and 642 on the guide 640 also include a ridged surface 650. The aperture 660 is configured to receive a bolt that in turn is used to secure a mounting rail (not shown) to the ridged surface 650, which provides friction to assist the connection.

The base 610 also includes a port hole 670. As shown in FIG. 13, the base 610 comprises a hollow cavity 627 that is accessible by the port hole 670. Once secured, as shown in FIG. 13, the steps of use are similar to the previously discussed mounts. Pilot holes 210 are bored, typically with a drill, into the roof 200 and the holes 210 are filled with sealant 175. The sealant gun 300 is used to inject sealant 175 into the port hole 670. In this embodiment, the port hole 670 can act both as a port hole 670 and a vent. The cavity 627 is filled with sealant 175 until the sealant 175 begins to escape out of the port hole 670 from the base 610 on the mount 600. When the sealant 175 begins to escape, it provides visual notice that the cavity 627 has been filled with sealant 175, thereby sealing the mount 600 to the roof 200.

Another exemplary embodiment is a universal flush mount 700 as shown in FIGS. 14-16. The universal flush mount 700 includes a base 710 and an opening 725 (shown in FIG. 16) in the middle of the mount 700 for a hanger bolt 730 that is used to secure the universal flush mount 700 to the roof 200. The hanger bolt 730 also has a shaft 735 extending downward and a threaded portion 737 on the shaft 735. The universal flush mount 700 includes an optional seal 715 that extends around the perimeter of the base 710. A washer 760 may be coupled between the top end of the hanger bolt 730 and the top surface of the base 710 to provide a tighter seal.

Figure 17:
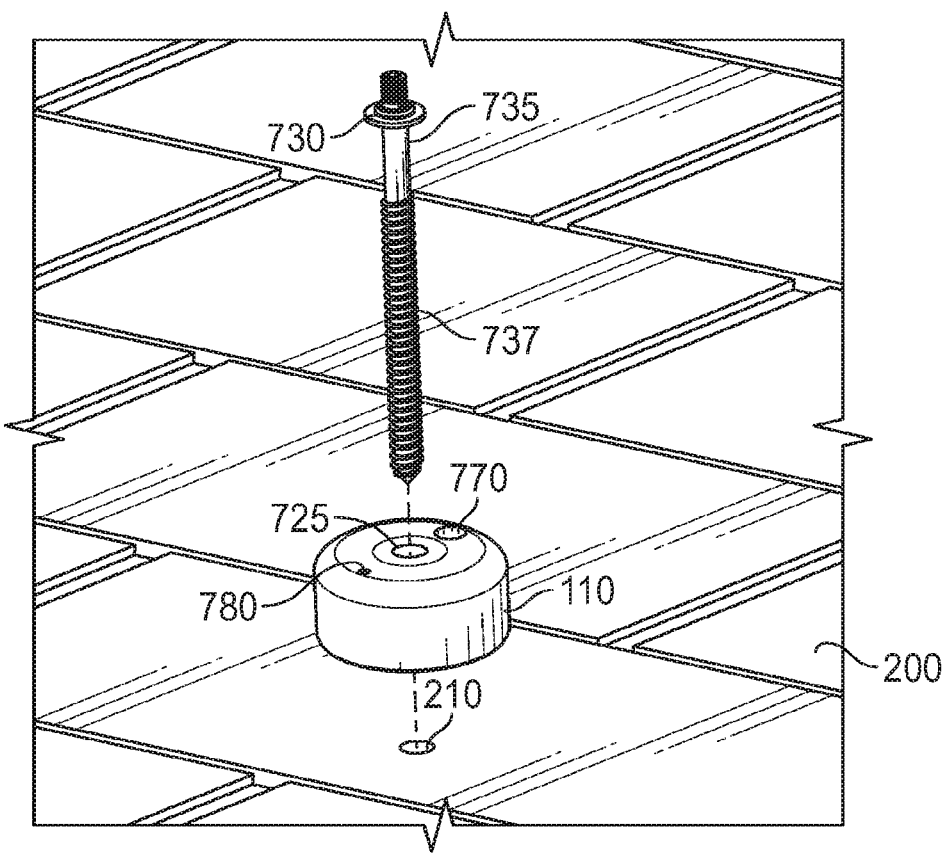
FIG. 17 illustrates an exploded perspective view of the flush mount attachment being secured to the roof of FIG. 4.
Figure 18:
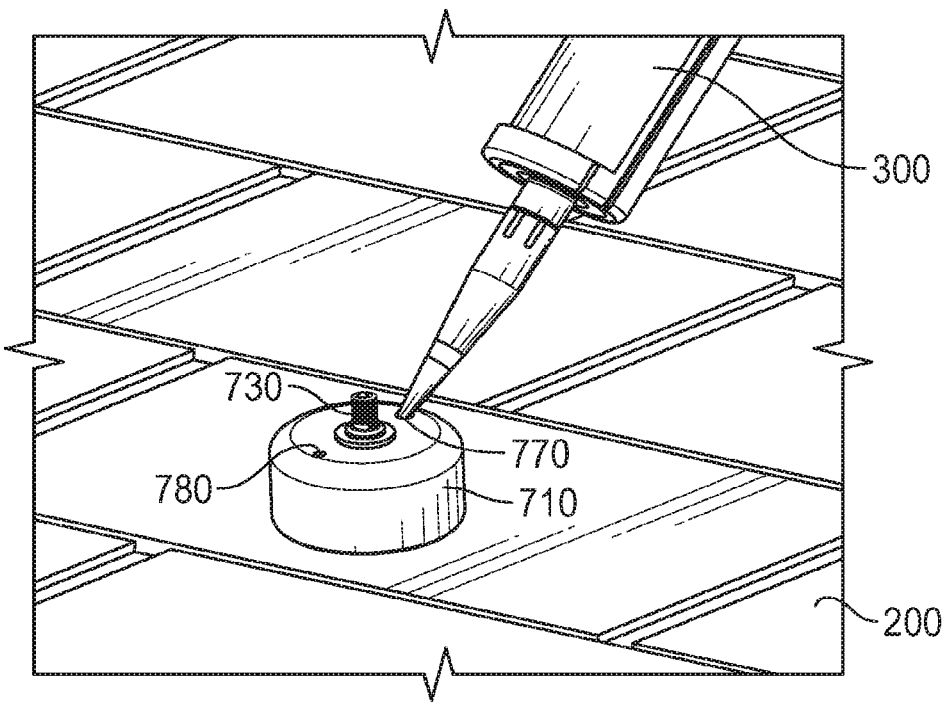
FIG. 18 illustrates a perspective view of the sealant gun applying sealant into a port hole on the flush mount attachment.

The base 710 also includes a port hole 770 on its top surface. As shown in FIG. 16, the base 710 comprises a hollow cavity 727 that is accessible by the port hole 770 and a vent 780 that are both typically on the top surface of the base 710. The port hole 770 is typically larger than the vent 780, although the port hole 770-like the other port holes as discussed herein, should be capable of fitting a sealant injection device like the sealant gun 300 as shown herein. As shown in FIG. 17, a pilot hole 210 is drilled into the roof 200 and the hole 210 is filled with sealant 175. The hanger bolt 730 is then inserted through the opening 725 and is tightened until the mount 700 is secured to the roof 200. Once secured, as shown in FIG. 18, the steps of use are similar to the previously discussed mounts. The sealant gun 300 is used to inject sealant 175 into the port hole 770. The cavity 727 is then filled with sealant 175 until the sealant 175 begins to escape through the port hole 780 from the base 710. When the sealant 175 begins to escape, it provides visual notice that the cavity 727 has been filled with sealant 175, thereby sealing the mount 700 to the roof 200.

Figure 19:
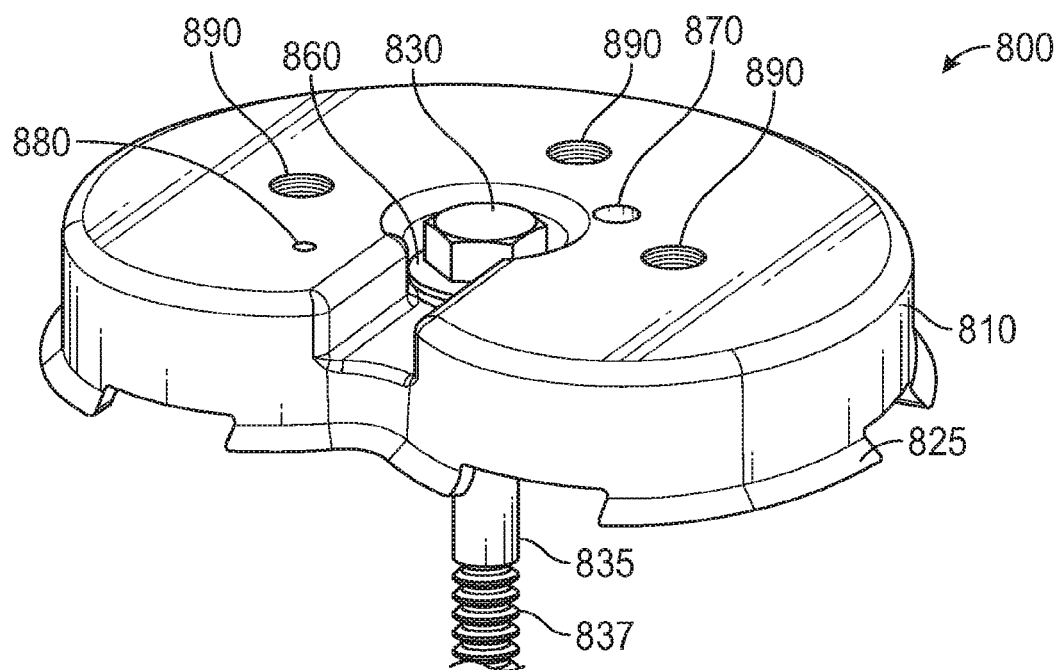
FIG. 19 illustrates a front perspective view of an exemplary universal base mount.
Figure 20:
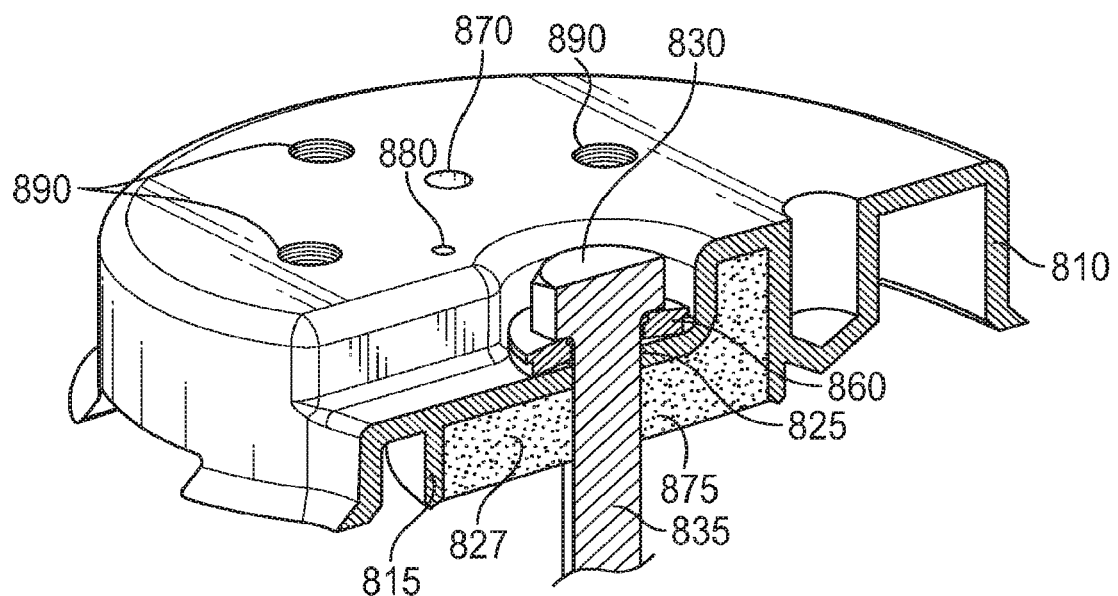
FIG. 20 illustrates a perspective cross-sectional view of the universal base mount.

Another exemplary embodiment is a universal base mount 800 as shown in FIGS. 19 and 20. The universal base mount 800 includes a base 810 and an opening 825 (shown in FIG. 20) in the middle of the mount 800 for a bolt 830 that is used to secure the universal base mount 800 to the roof 200. The bolt 830 also has a shaft 835 extending downward and a threaded portion 837 on the shaft 835. The universal base mount 800 also includes a plurality of internally threaded apertures 890 that are used to secure a mount (not shown) to the universal base mount 800. The mount 800 also includes an optional seal 815 that extends around the perimeter of a cavity 827 within the base 810. A washer 860 may be coupled between the top end of the bolt 830 and the top surface of the base 810 to provide a tighter seal.

Figure 21:
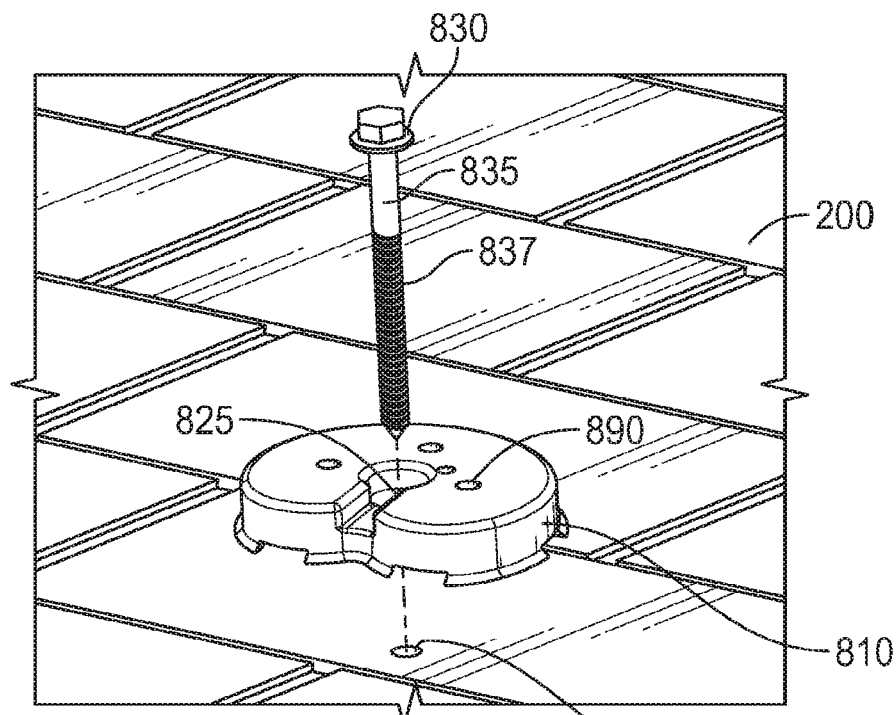
FIG. 21 illustrates an exploded perspective view of the universal base mount being secured to the roof of FIG. 4.
Figure 22:
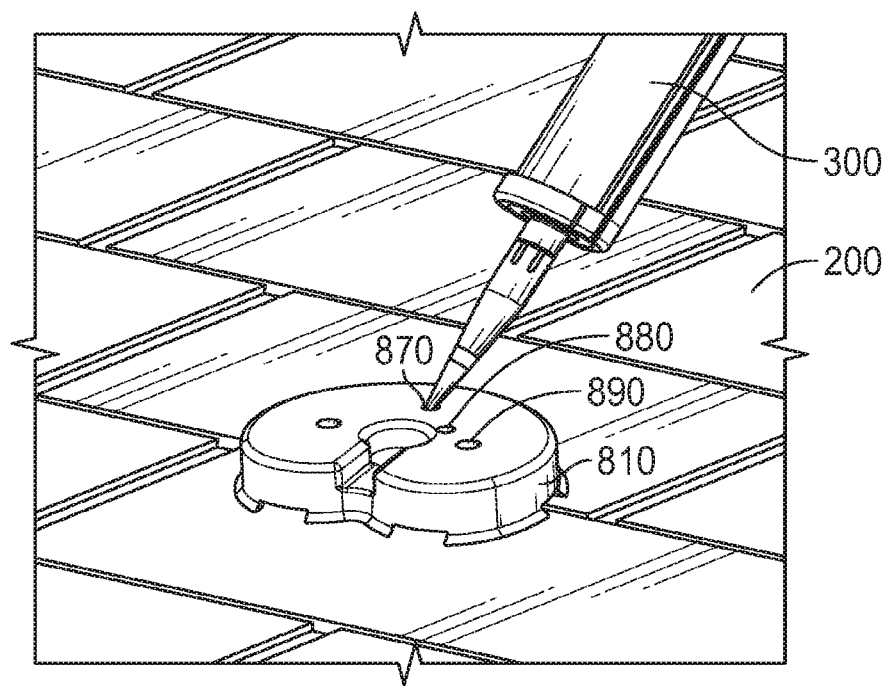
FIG. 22 illustrates a perspective view of the sealant gun applying sealant into a port hole on the universal base mount.

The base 810 also includes a port hole 870 on its top surface. As shown in FIG. 20, the base 810 comprises the hollow cavity 827 that is accessible by the port hole 870 and a vent 880 that are both typically on the top surface of the base 810. The port hole 870 is typically larger than the vent 880, although the port hole 870-like the other port holes as discussed herein, should be capable of fitting a sealant injection device like the sealant gun 300 as shown herein and are typically positioned on opposite sides of the base 810. As shown in FIG. 21, a pilot hole 210 is bored, typically with a drill, into the roof 200 and the hole 210 is filled with sealant 175. The bolt 830 is then inserted through the opening 825 and is tightened until the mount 800 is secured to the roof 200. Once secured, as shown in FIG. 22, the steps of use are similar to the previously discussed mounts. The sealant gun 300 is used to inject sealant 175 into the port hole 870. The cavity 827 is then filled with sealant 175 until the sealant 175 begins to escape through the port hole 880 from the base 810. When the sealant 175 begins to escape, it provides visual notice that the cavity 827 has been filled with sealant 175, thereby sealing the mount 800 to the roof 200.

Figure 23:
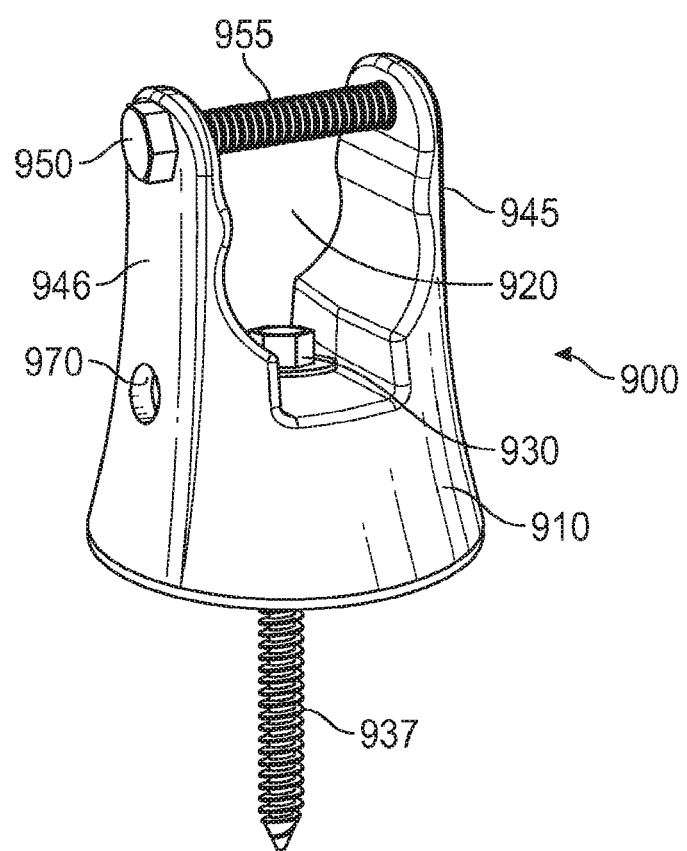
FIG. 23 illustrates a front perspective view of an exemplary conduit mount.
Figure 24:
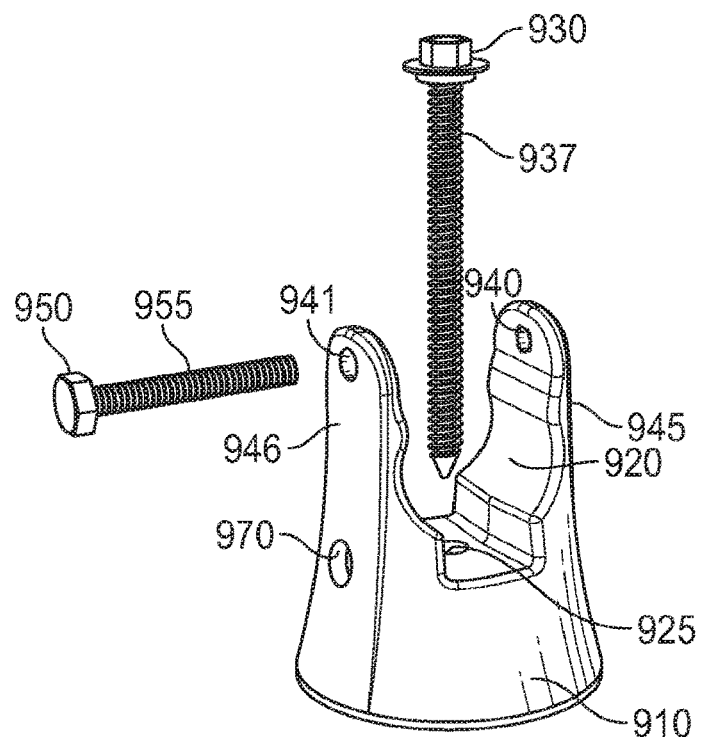
FIG. 24 illustrates an exploded perspective view of the conduit mount.
Figure 25:
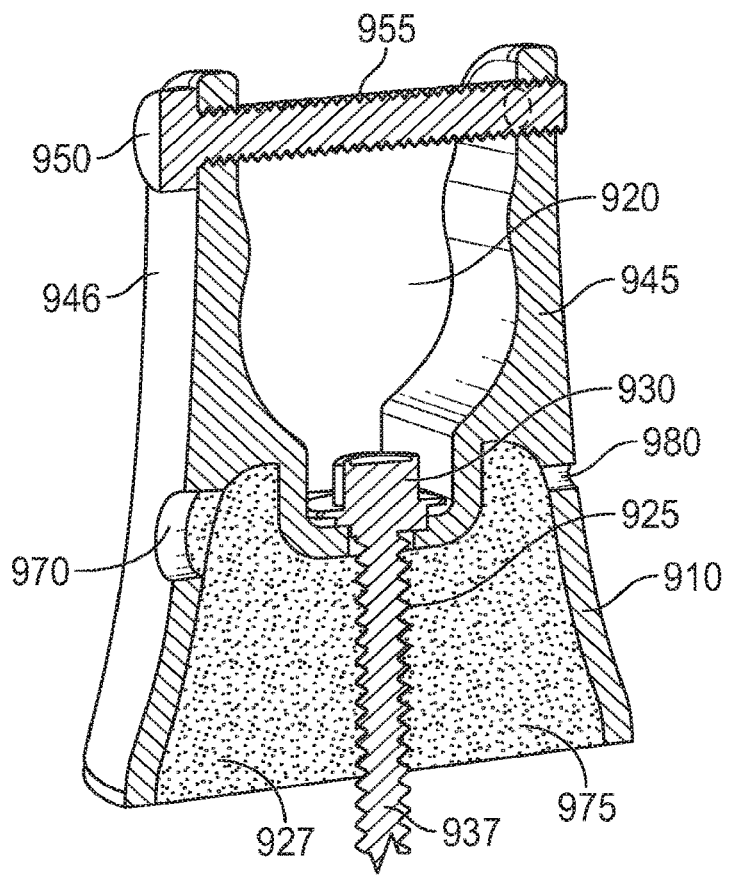
FIG. 25 illustrates a cross-sectional view of the conduit mount.
Figure 28:
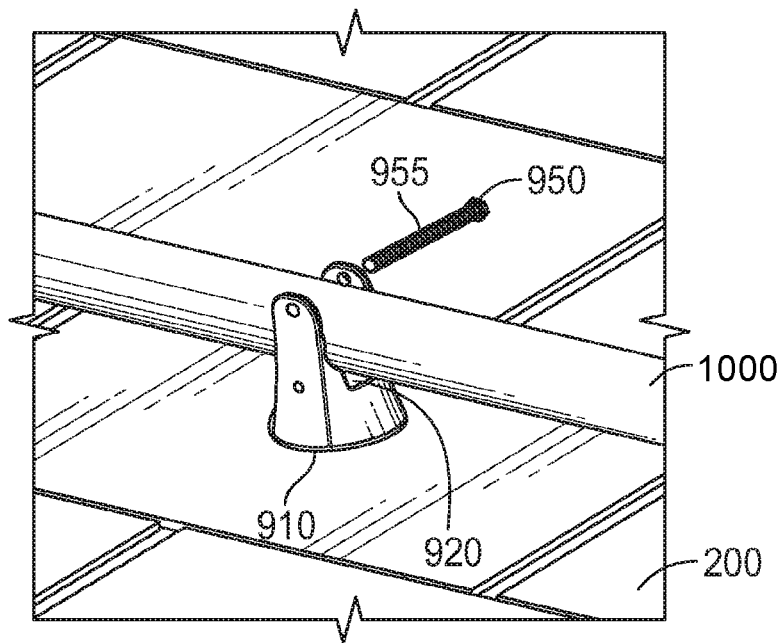
FIG. 28 illustrates a perspective view of the conduit mount with a conduit being assembled to the roof of FIG. 4.

Another exemplary embodiment is a conduit mount 900 as shown in FIGS. 23-25. The conduit mount 900 typically supports a conduit 1000, which can be of any suitable shape such as a cylindrical pipe as shown in FIG. 28. As shown in FIG. 23, the conduit mount 900 includes a base 910 and an opening 925 (shown in FIG. 24) in the middle of the mount 900 for receiving a bolt 930 that is used to secure the conduit mount 900 to the roof 200. The bolt 930 also has a shaft 935 extending downward and a threaded portion 937 on the shaft 935. The base 910 typically tapers upward and forms a generally U-shaped guide that comprises a pair of members 945 and 946 extending from opposing sides of the base 910, which in turn forms an opening 920 configured to receive the conduit 1000. Each of the members 945 and 946 also includes a threaded aperture 940 and 941 respectively. The apertures 945 and 946 are configured to receive a securing bolt 950 that is threaded 955.

Figure 26:
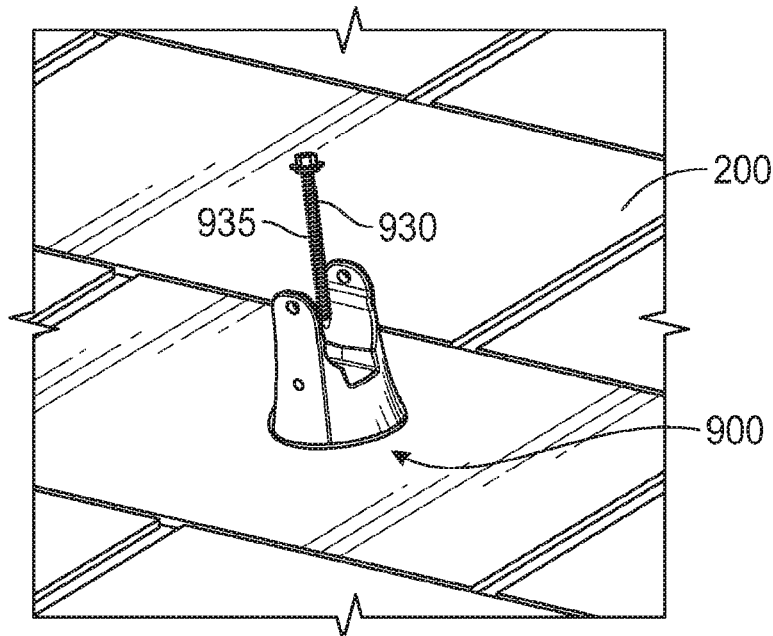
FIG. 26 illustrates a front perspective exploded view of the conduit mount being secured to the roof of FIG. 4.
Figure 27:
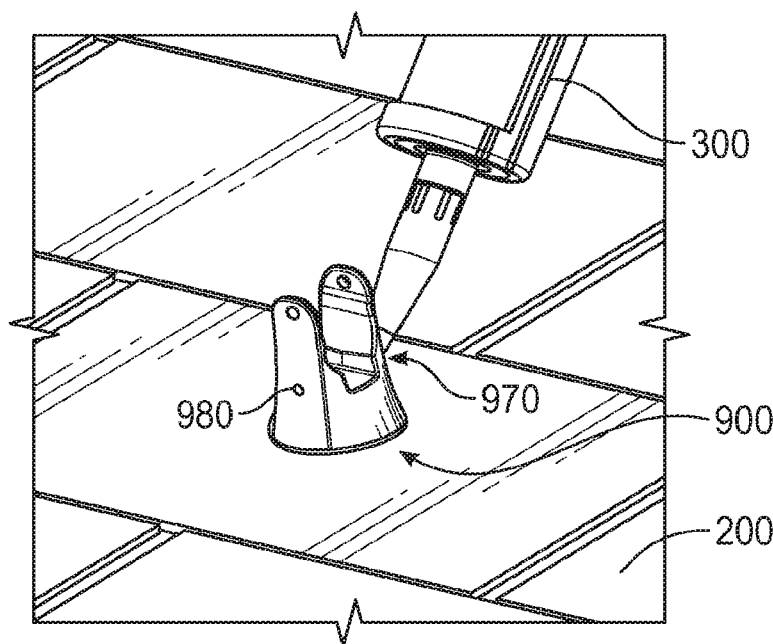
FIG. 27 illustrates a perspective view of the sealant gun applying sealant into a port hole of the conduit mount.

The base 910 also includes a port hole 970 on its outer surface. As shown in FIG. 25, the base 910 comprises the hollow cavity 927 that is accessible by the port hole 970 and a vent 980 that are both typically on the outer surface of the base 910. The port hole 970 is typically larger than the vent 980, although the port hole 970-like the other port holes as discussed herein, should be capable of fitting a sealant injection device like the sealant gun 300 as shown herein and are typically positioned on opposite sides of the base 910. As shown in FIG. 26, the bolt 930 is inserted through the opening 925 and is tightened until the mount 900 is secured to the roof 200. Once secured, as shown in FIGS. 27 and 28, the steps of use are similar to the previously discussed mounts. The sealant gun 300 is used to inject sealant 175 into the port hole 970. The cavity 927 is then filled with sealant 175 until the sealant 175 begins to escape through the port hole 980 from the base 910. When the sealant 175 begins to escape, it provides visual notice that the cavity 927 has been filled with sealant 175, thereby sealing the mount 900 to the roof 200. Once the conduit mount 900 is secured to the roof 200, the conduit 1000 can be inserted through the opening 920 and secured to the mount 900 by using the second bolt 950 and tightening it through the apertures 940 and 941 using the threaded portion 955 of the second bolt 950.

Figure 29:
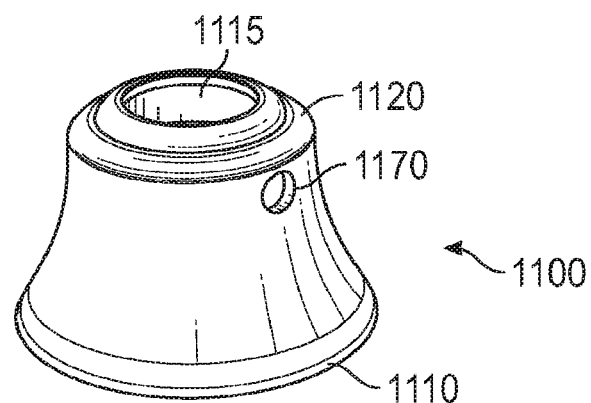
FIG. 29 illustrates a front perspective view of an exemplary conduit riser.
Figure 30:
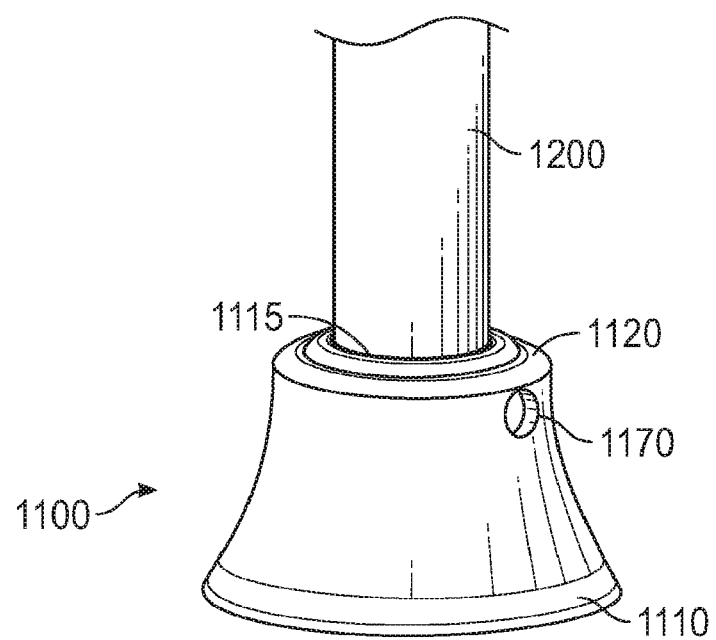
FIG. 30 illustrates a front perspective view of the conduit riser with the conduit.
Figure 31:
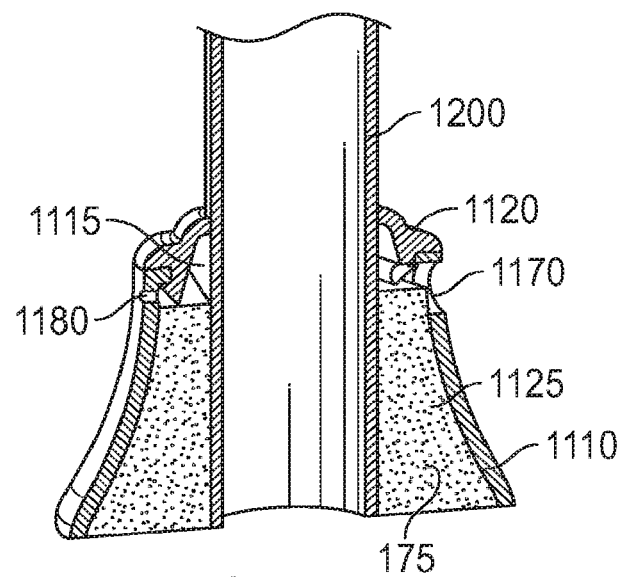
FIG. 31 illustrates a front perspective cross-sectional view of the conduit riser with the conduit.
Figure 33:
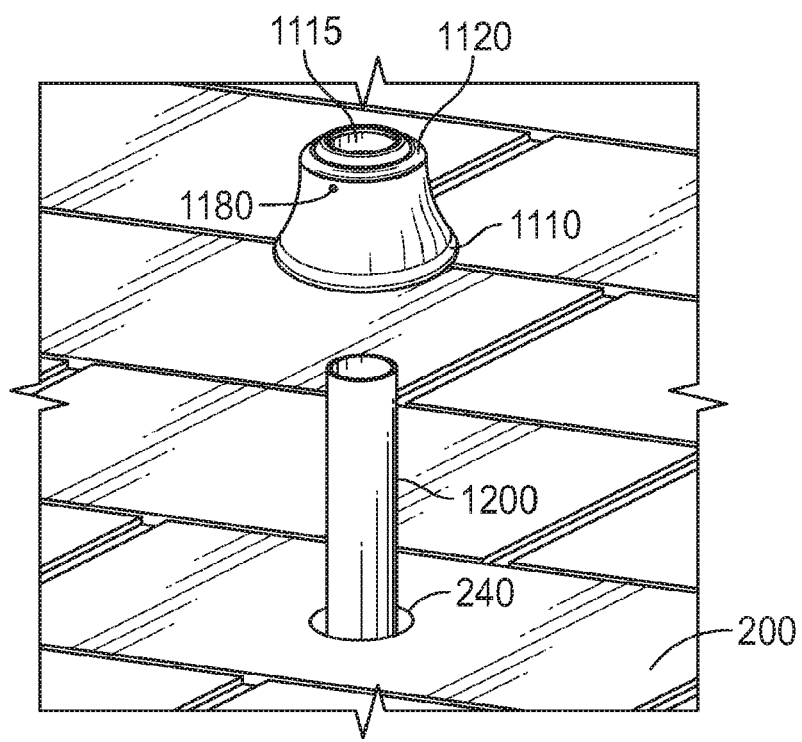
FIG. 33 illustrates a front perspective exploded view of the conduit riser secured to the roof of FIG. 32.

Another exemplary embodiment is a conduit riser attachment 1100 as shown in FIGS. 29-31. The conduit riser 1100 typically fits over a conduit that rises through the roof 200 through a conduit hole 240 as shown in FIG. 33. The conduit riser 1100 includes a base 1110, that extends upward to a top end with a conduit gasket 1120 on the top end that surrounds an opening 1115 that is configured to receive a conduit 1200 as shown in FIG. 30.

The base 1110 also includes a port hole 1170 on its outer surface. As shown in FIGS. 29-31, the base 1110 comprises the hollow cavity 1125 for holding sealant 175 and is accessible by the port hole 1170 and a vent 1180 that are both typically on the outer surface of the base 1110. The port hole 1170 is typically larger than the vent 1180, although the port hole 1170-like the other port holes as discussed herein, should be capable of fitting a sealant injection device like the sealant gun 300 as shown herein and are typically positioned on opposite sides of the base 1110.

Figure 32:
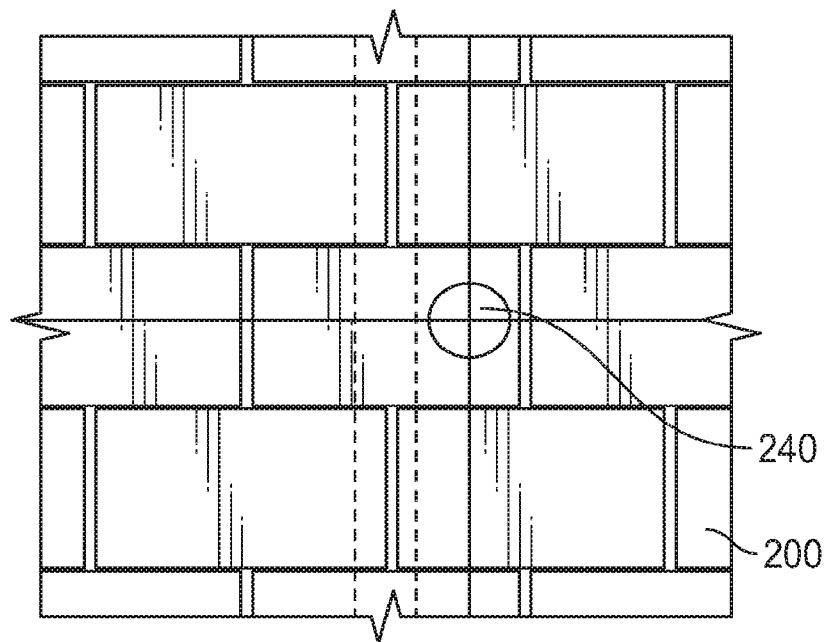
FIG. 32 illustrates a top view of the roof of FIG. 4 with an opening for the conduit.

As shown in FIG. 32, the conduit hole 240 is bored into the roof 200. The conduit 1200 is then attached to a rafter in an attic (not shown) below the roof 200. The conduit riser 1100 is then placed over the conduit 1200 as shown in FIG. 33 until fully seated on the roof 200. The sealant gun 300 is used to inject sealant 175 into the port hole 1170. The cavity 1127 is then filled with sealant 175 until the sealant 175 begins to escape through the port hole 1180 from the base 1110. When the sealant 175 begins to escape, it provides visual notice that the cavity 1127 has been filled with sealant 175, thereby sealing the conduit riser 1100 to the roof 200. Once the conduit riser 1100 is secured to the roof 200, the process is complete.

Figure 34:
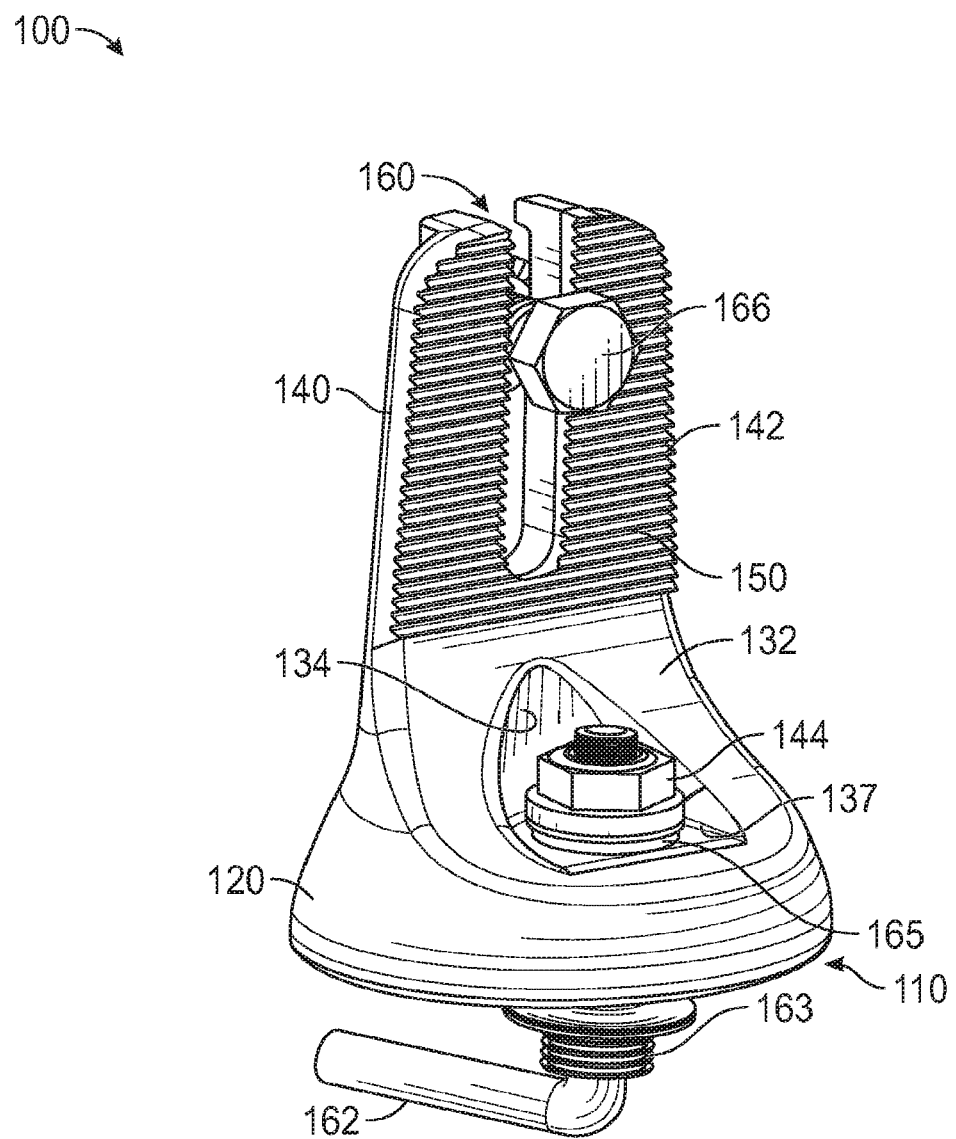
FIG. 34 illustrates a front perspective view of an alternate embodiment of the mount shown in FIGS. 1-6 that utilizes an anchor bolt for securing the mount to a roof.
Figure 35:
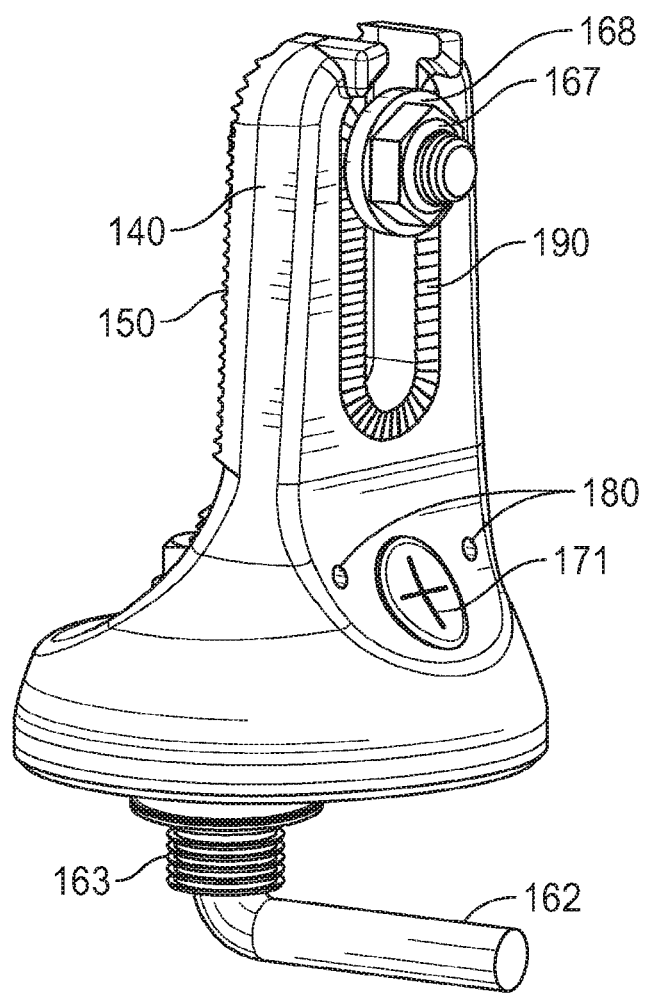
FIG. 35 illustrates a rear perspective view of the embodiment in FIG. 34.
Figure 36:
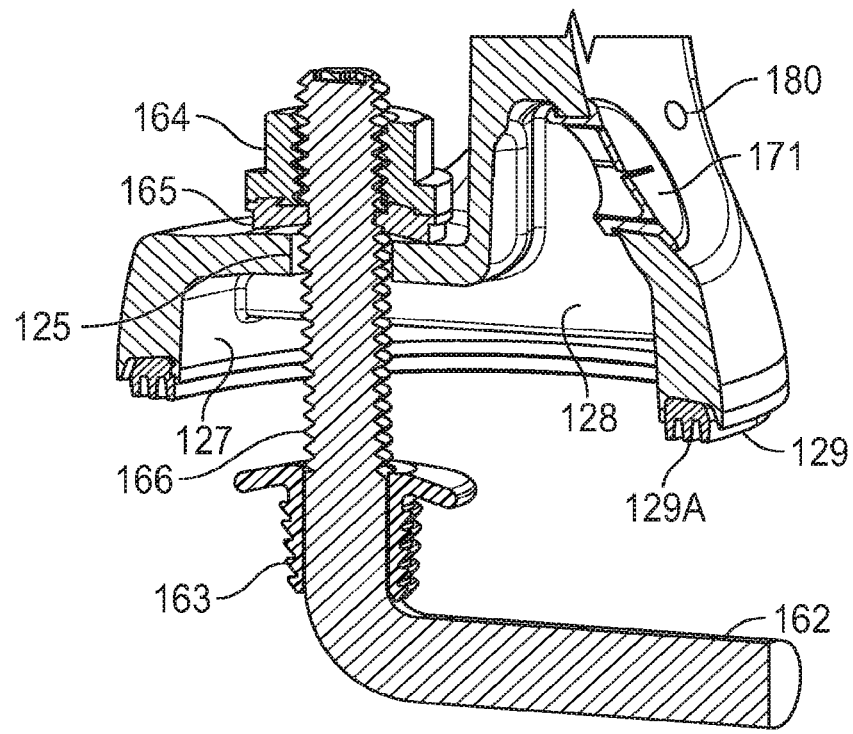
FIG. 36 illustrates a side cross-sectional view of the embodiment in FIG. 35.
Figure 37:
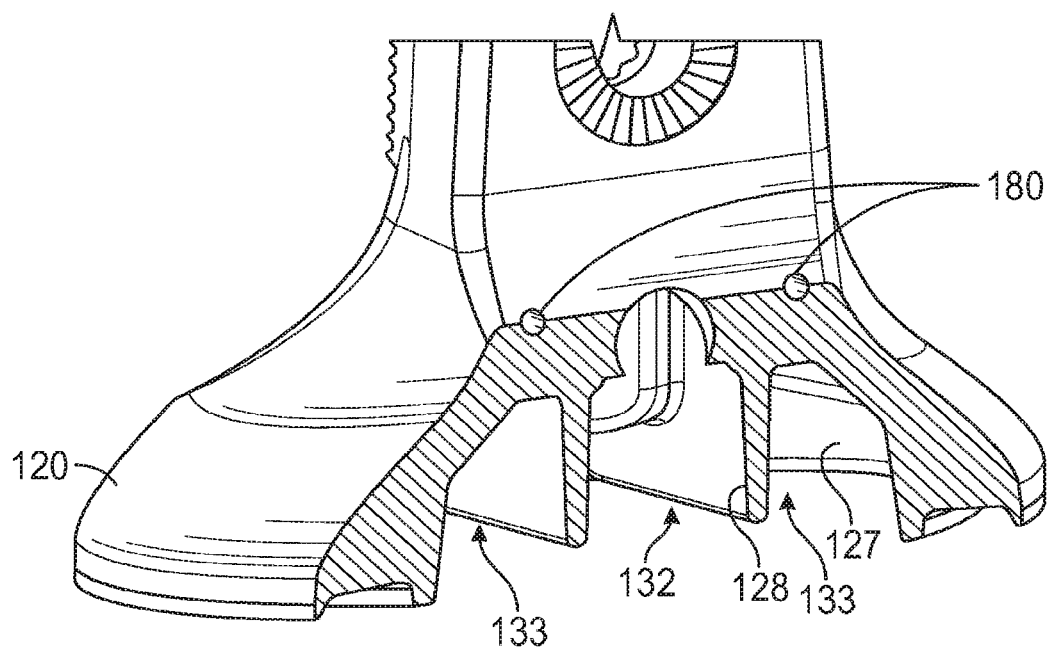
FIG. 37 illustrates a rear cross-sectional view of the embodiment in FIG. 35.
Figure 38:
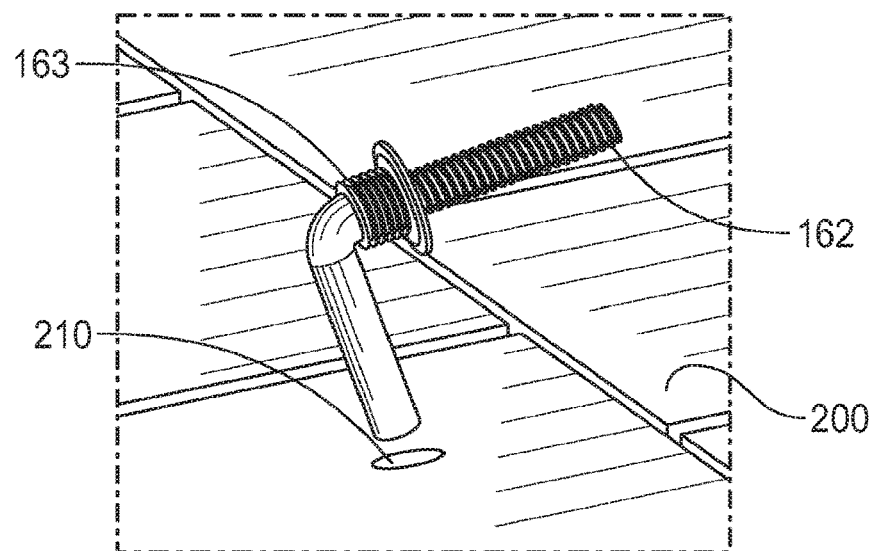
FIG. 38 illustrates a front perspective view of the anchor bolt used to secure the embodiment in FIG. 34 prior to insertion into a pilot hole of a roof.
Figure 39:
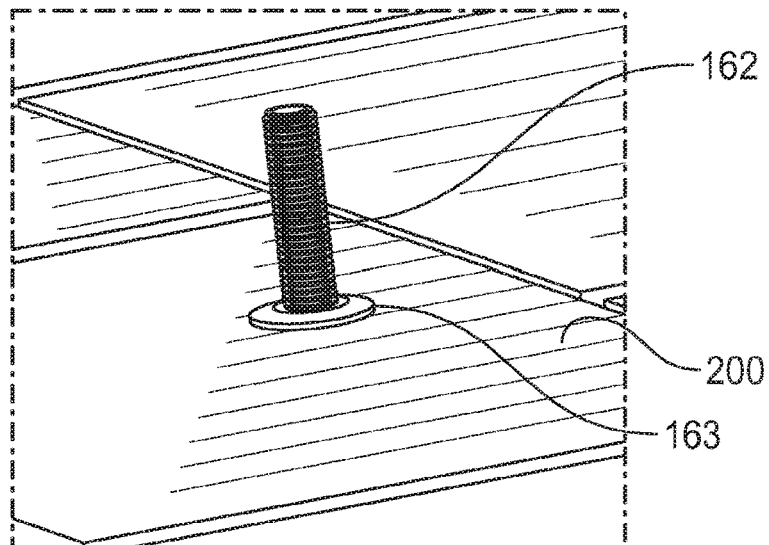
FIG. 39 illustrates a front perspective view of the anchor bolt used to secure the embodiment in FIG. 34 after being installed into a pilot hole of the roof.
Figure 40:
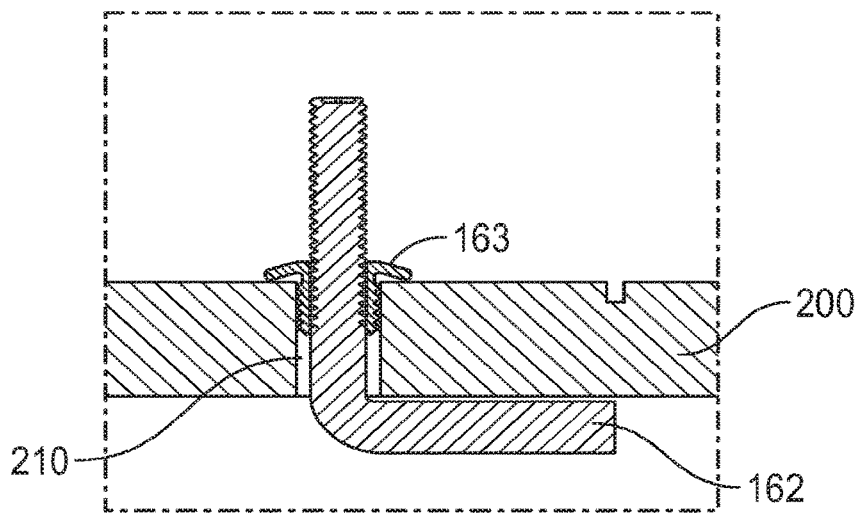
FIG. 40 illustrates a side cross-sectional view of the installed anchor bolt in FIG. 39.
Figure 41:
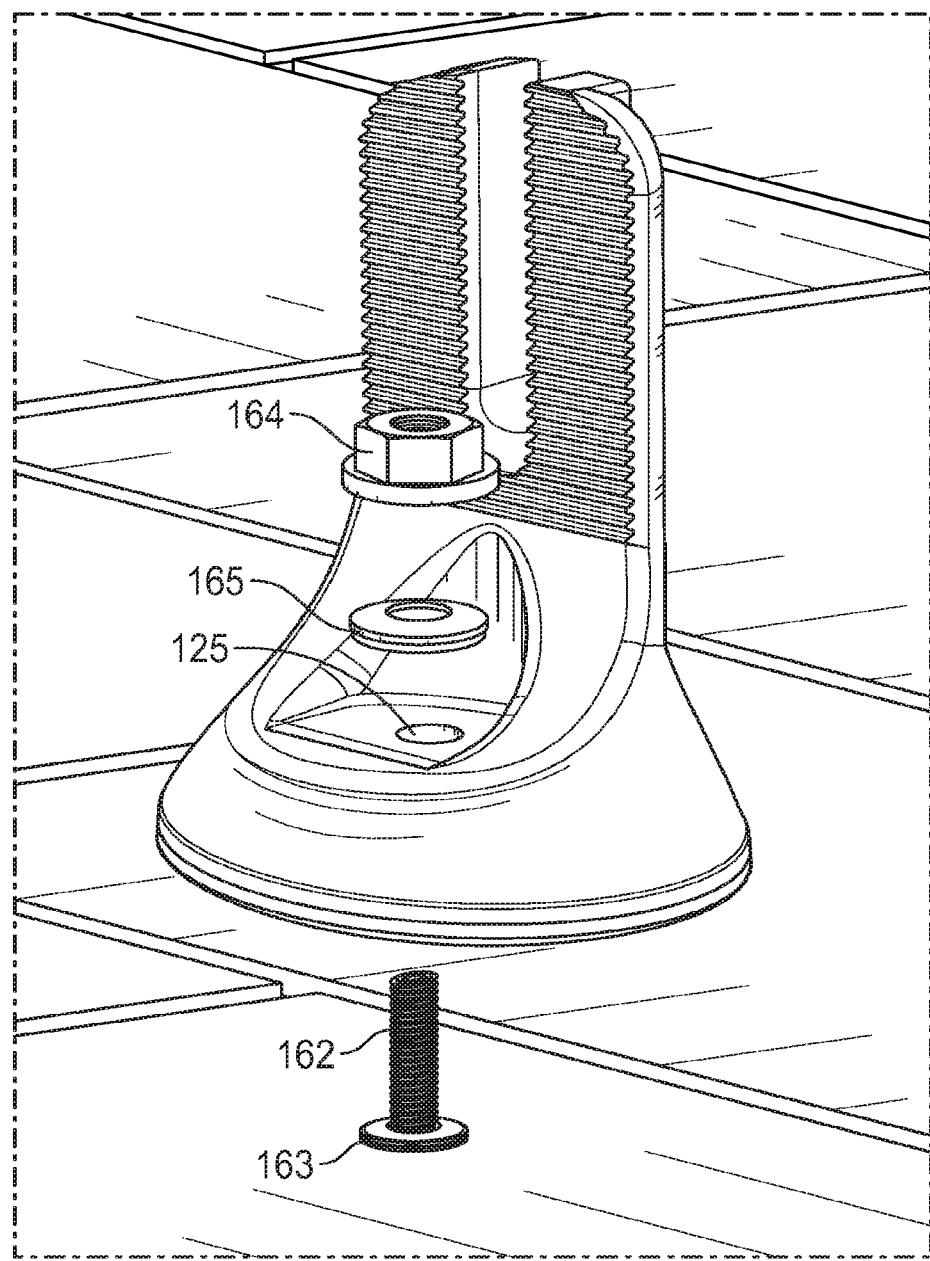
FIG. 41 illustrates an exploded view of an installed version of the embodiment in FIG. 34.
Figure 42:
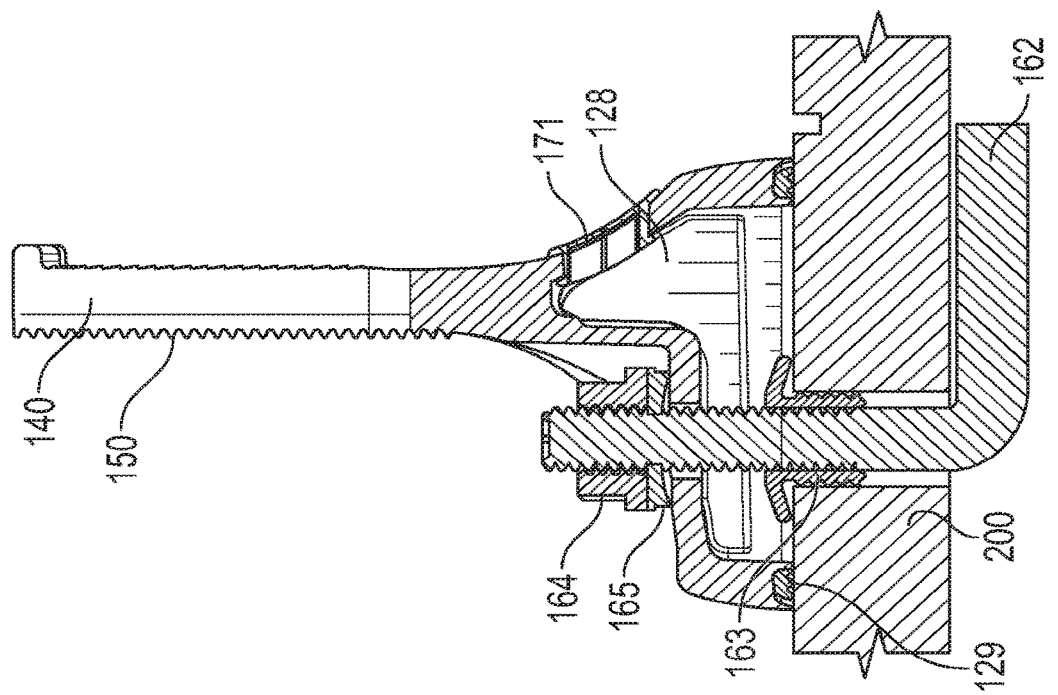
FIG. 42 illustrates a side cross-sectional view of an installed version of the embodiment in FIG. 34.

Another exemplary embodiment is shown in FIGS. 34-42 and is a variation of the flush-type mount 100 shown in FIGS. 1-6. This embodiment provides two different features. First, referring to FIG. 34, instead of securing the mount 100 to roof 200 by using bolt 130, the mount is secured by utilizing an anchor bolt 162 in combination with a grommet 163. Referring to FIGS. 38-40, the anchor bolt 162 includes two legs that are bent so that they are generally at a right angle to each other. At least one of the legs includes external threads 166 that are configured to receive a threaded bolt 164. The grommet 163, is inserted into the pilot hole 210 so that the external threads on the grommet 163 fit snuggly into the pilot hole 210 and the grommet 163 is near the bend in the anchor bolt 162 as shown in FIG. 38. It is understood that the grommet 163 can include internal threads that allow it to be rotated along the threaded portion 166 of one of the legs of the anchor bolt 162 until the grommet 163 resides near the bend of the anchor bolt 162 as well. The anchor bolt 162 is installed by inserting the second leg of the anchor bolt 162 into the pilot hole 210 so that the inserted leg is positioned generally parallel to, and beneath the roof 200 with the grommet 163 being firmly secured within the pilot hole 210 as shown in FIGS. 39 and 40. Once installed, the threaded leg of the anchor bolt 162 is exposed and firmly positioned to receive the mount 100 through opening 125. Referring to FIGS. 34-35, and the exploded view of FIG. 41, the mount 100 is secured by affixing a nut 164 on the threaded leg of the anchor bolt 162 over an optional washer 165. A standard bolt 166 is typically inserted into the aperture 160 and can secure other objects to the rear side of the mount 100 with a standard nut 167 and washer 168 combination. The cross-sectional views in FIGS. 36 and 42 illustrate the final installation in more detail.

Second, as shown in FIG. 35, the mount 100 includes a modified sealant port hole 171 that typically is comprised of a flexible material such as rubber and provides for easy insertion of the sealant gun 300 and provides for improved delivery of sealant into the cavity 127. An additional vent 180 that is coupled to the cavity 127 is also included.

Referring to FIGS. 36 and 37, the cavity 127 further comprises a pair of sealant guides 128. Each sealant guide 128 is a vertical barrier that extends downward from the upper wall of the cavity 127 and ends slightly above the bottom of the mount 100. Each of the guides 128 form a channel 132 and two outer chambers 133 that are interconnected with each other within the cavity 127. The outer chambers 133 are coupled to each of the vent holes 180 respectively and are designed to provide a more uniform distribution of sealant as it is inserted from the sealant gun 300 into the port hole 171. The channel 132 is coupled to the sealant port hole 171 and is configured to directly receive sealant from the sealant gun 300. As the sealant is inserted into, and begins filling the channel 132, the guides 128 serve to uniformly direct the sealant into each of the outer chambers 133. When the outer chambers 133 become filled with sealant, the sealant will begin to evacuate from the vent holes 180 and give visual notice that the entire cavity 127 is filled. An optional seal 129 is also included. The seal 129 includes a plurality of ribs 129A that provide added sealing capability to prevent sealant leaks under pressure. The ribs 129A can be solid or flexible depending on the needs of the installer.

Figure 43:
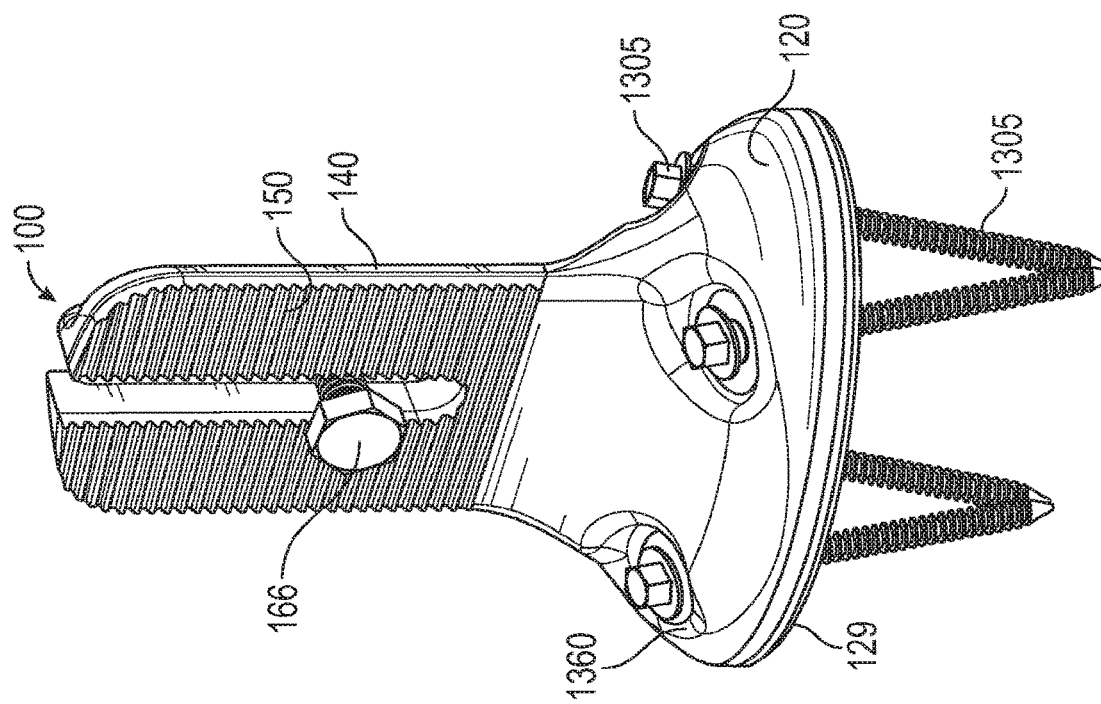
FIG. 43 illustrates a front perspective view of an alternate embodiment of the mount shown in FIG. 34 that utilizes multiple angled screws to secure the mount to a roof.
Figure 44:
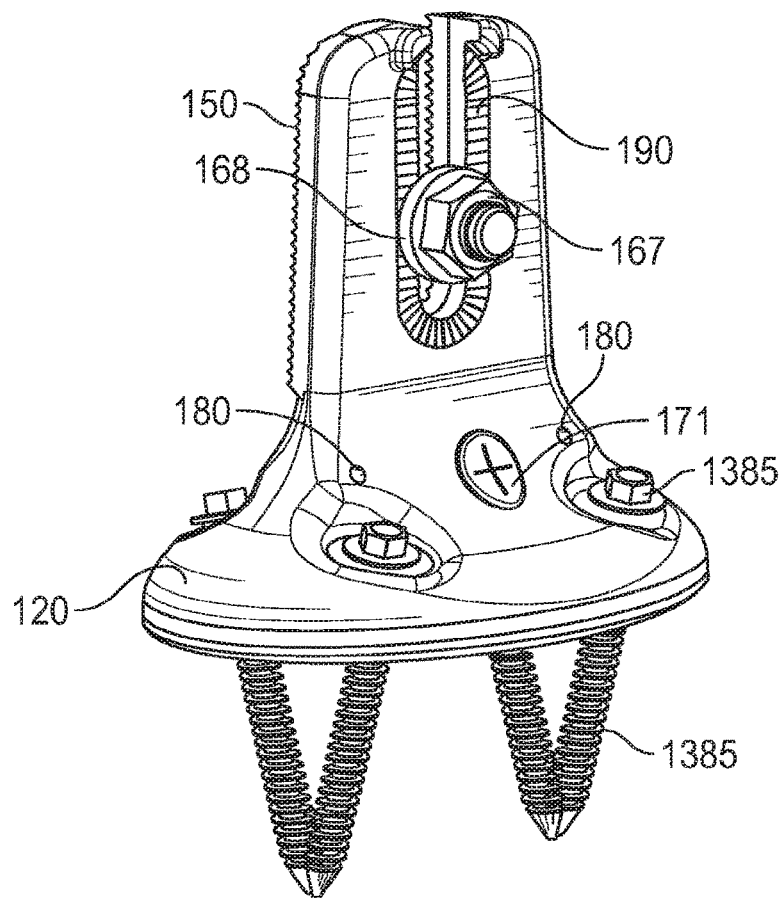
FIG. 44 illustrates a rear perspective view of the embodiment shown in FIG. 43.
Figure 45:
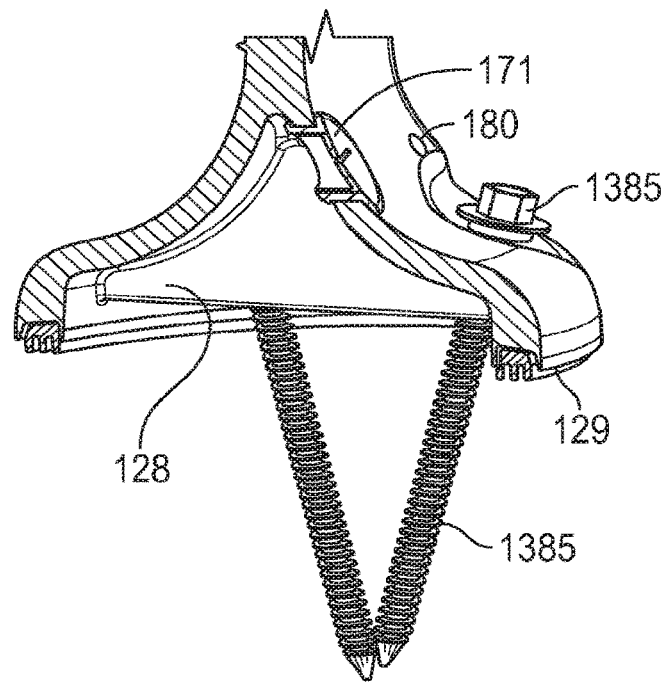
FIG. 45 illustrates a cross-sectional perspective view of the embodiment shown in FIG. 43.

Another exemplary embodiment is shown in FIGS. 43-45 and is a variation of the flush-type mount 100 shown in FIGS. 34-42. Instead of securing the mount 100 to the roof 200 by utilizing a single anchor bolt 162, the mount 100 is secured by utilizing four screws 1385 as shown. Each of the screws 1385 is threaded and inserted through corresponding apertures 1360 that are positioned on the opposite ends of the front and rear sides of the mount 100 and are slightly angled inward toward the center of the mount 100.

The mount is installed by placing the mount 100 at the desired location on the roof 200 and inserting each of the screws 1385 into the apertures 1360 and drilling them into the roof 200. It is understood by one of ordinary skill in the art that although the angles of the apertures 1360 are directed inward, the particular angles are not determinative in securing the mount 100 to the roof 200. It is also understood that although four screws 1385 are preferred, the number of screws and apertures 1385 used can vary as long as they secure and seal the mount 100 to the roof 200.

Figure 46:
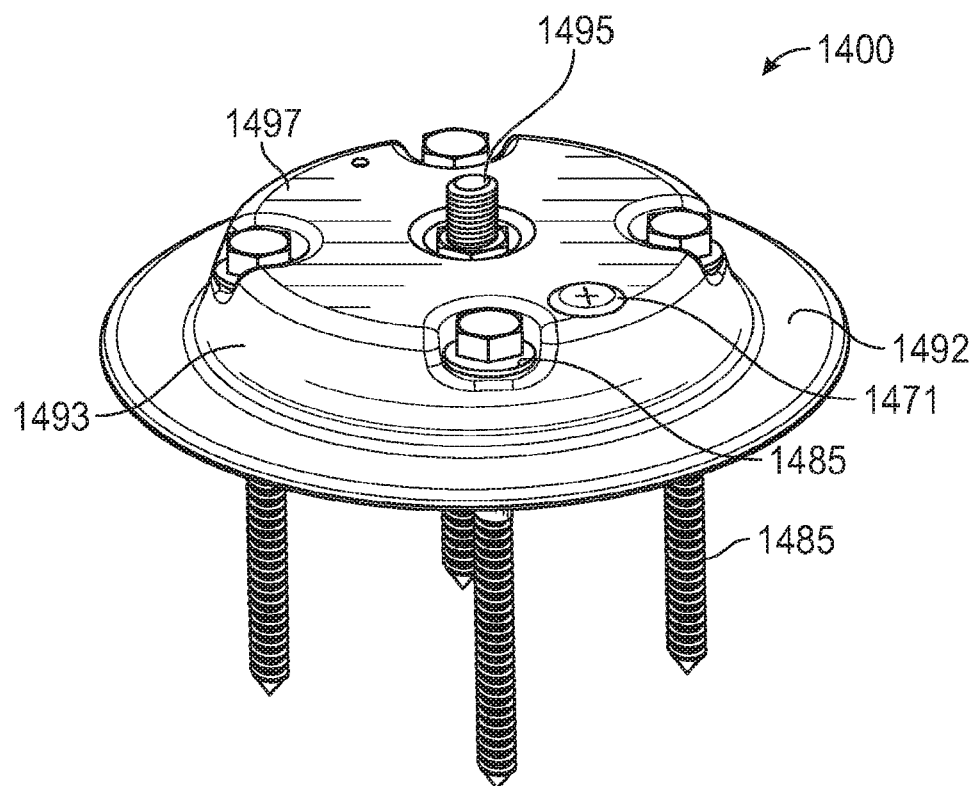
FIG. 46 illustrates a perspective view of a low-slope universal attachment mount.
Figure 47:
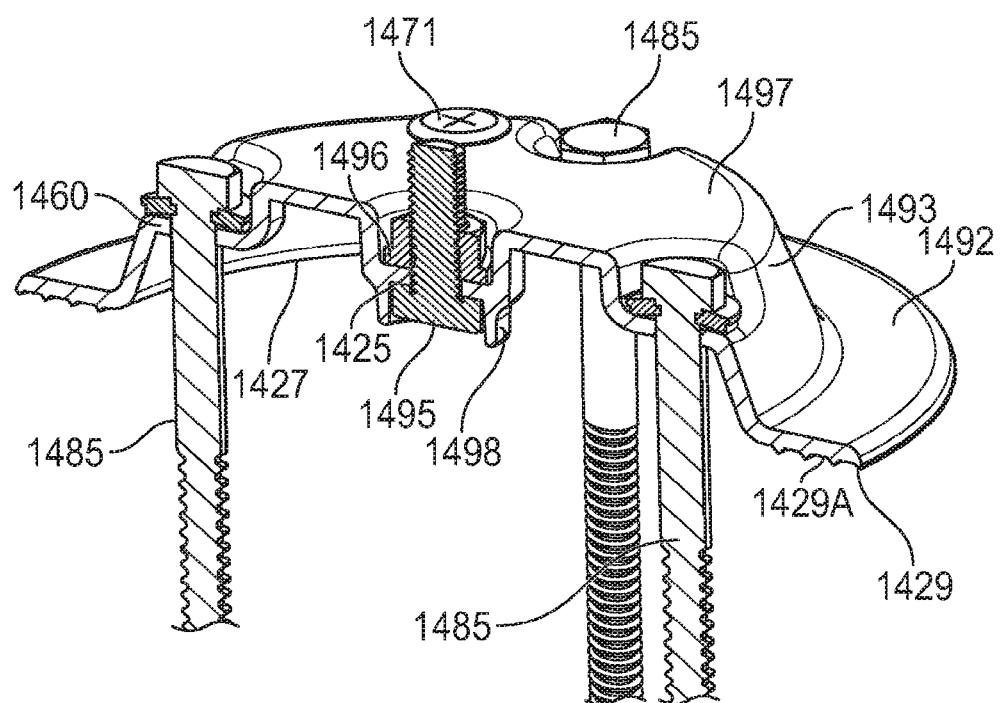
FIG. 47 illustrates a cross-sectional perspective view of the embodiment shown in FIG. 46.
Figure 48:
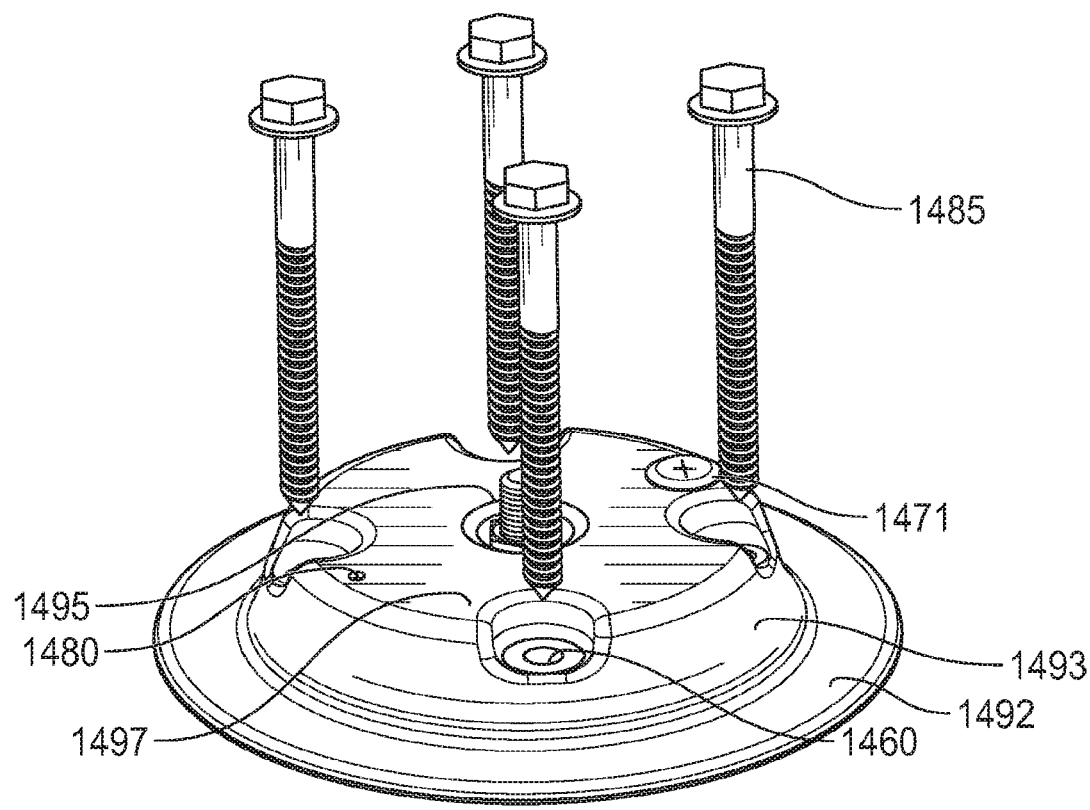
FIG. 48 illustrates an exploded view of the embodiment shown in FIG. 46.

Another exemplary embodiment of a mount with similar features as the prior mounts is shown in FIGS. 46-48. In this embodiment, a low-slope universal attachment mount 1400 is shown. Referring to FIGS. 46 and 47, the mount 1400 comprises a base 1493 that includes an outer shell 1492 with a flanged sealing lip 1429 comprising a plurality of ribs 1429A extending from the sealing lip's 1429 lower surface. It is understood that the ribs 1429A can be flexible or rigid. The base 1493 has a top support surface 1497 that is generally round and tapers downward toward the outer shell 1492 that forms a cavity 1427. The top support surface 1497 further comprises a port hole 1471 and vent hole 1480. The port hole 1471 and vent hole 1480 operate in the same fashion as port holes and vent holes in earlier-described embodiments wherein sealant from the sealant gun 300 is inserted into the cavity 1427 through the port hole 1471 until it begins to evacuate from the vent hole 1480. Even though it is desired to locate the port hole 1471 and vent hole 1480 on opposite sides of the top support surface 1497 to maximize the amount of sealant that is inserted into the port hole 1471 before it begins to evacuate from the vent hole 1480, the specific location of these holes can be in different locations on the top support surface 1497.

The base 1493 is secured to the roof 200 by inserting a plurality of threaded screws 1485 into corresponding apertures 1460 that are positioned at different locations around the perimeter of the top support surface 1497 as shown in FIG. 48. Each screw 1485 is drilled into the roof 200. Optionally, a pilot hole corresponding to each screw 1485 can be created and filled with sealant prior to installation to provide further protection against leaks. At the center of the top support surface 1497 is an opening 1425. The opening 1425 is configured to receive attachment bolt 1495 from beneath the top support surface 1497. The attachment bolt 1495 includes outer threads and a head that rests within seat 1498. An attachment nut 1496 is typically used to tighten the attachment bolt 1497 into the seat 1498 so that the threaded portion of the attachment bolt 1495 is exposed above the top support surface 1497 and can then be used to secure a bracket (not shown) onto the top support surface 1497.

Figure 49:
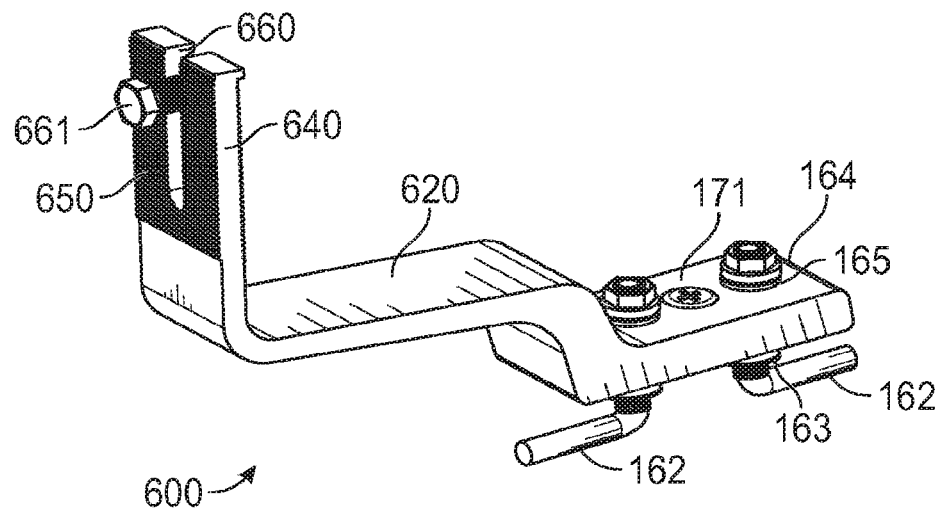
FIG. 49 illustrates a front perspective view of an alternate embodiment of the mount shown in FIGS. 12 and 13 that utilizes anchor bolts to secure the mount to a roof.
Figure 50:
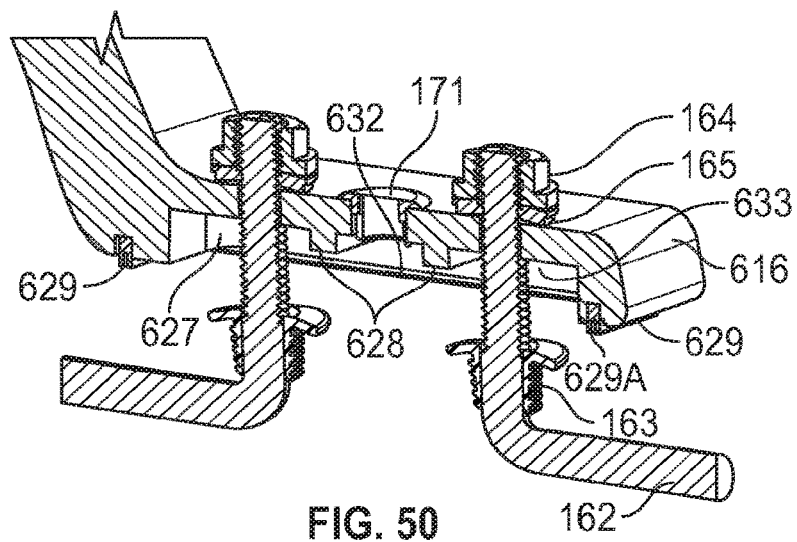
FIG. 50 illustrates a cross-sectional perspective view of the embodiment shown in FIG. 49.
Figure 51:
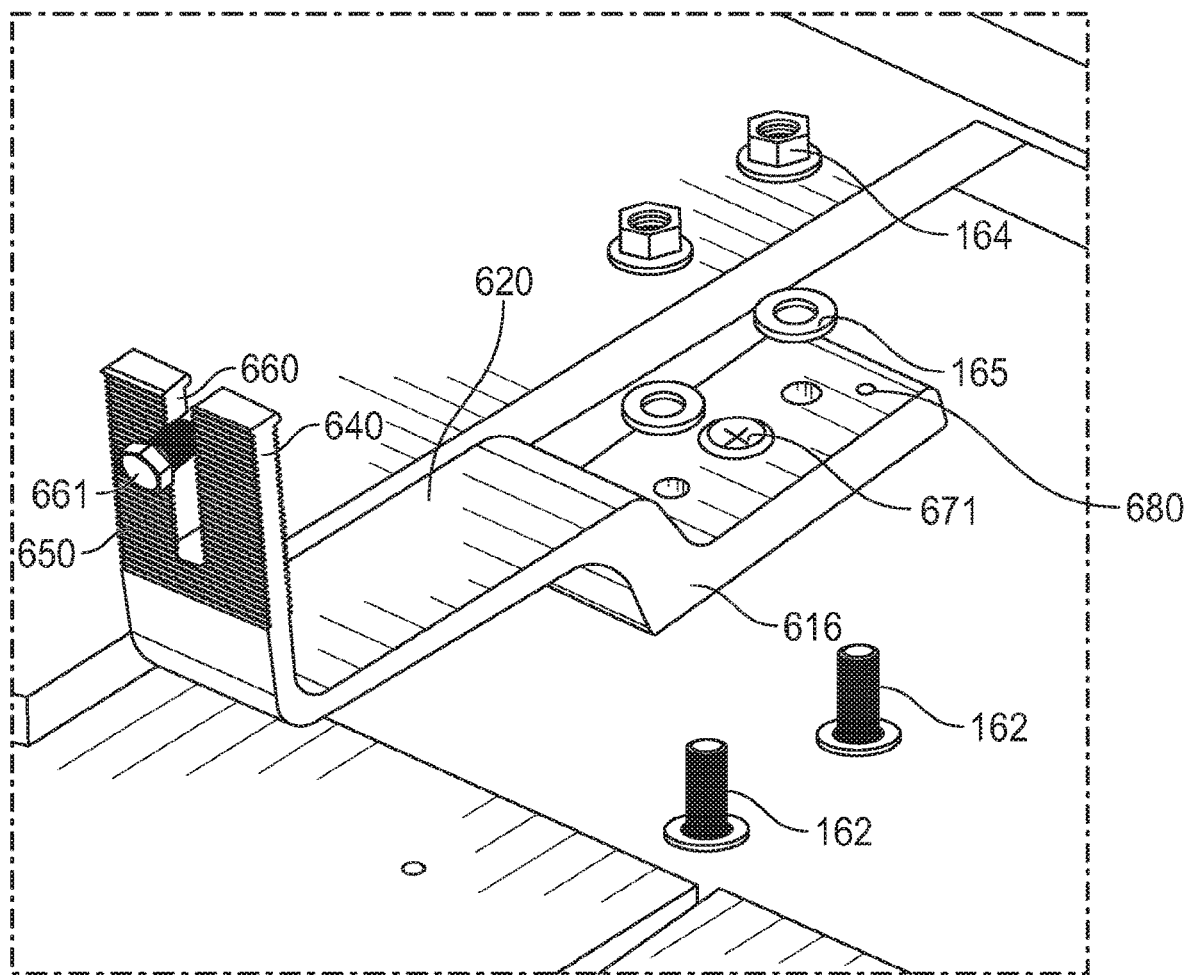
FIG. 51 illustrates an exploded perspective view of the embodiment shown in FIG. 49.
Figure 52:
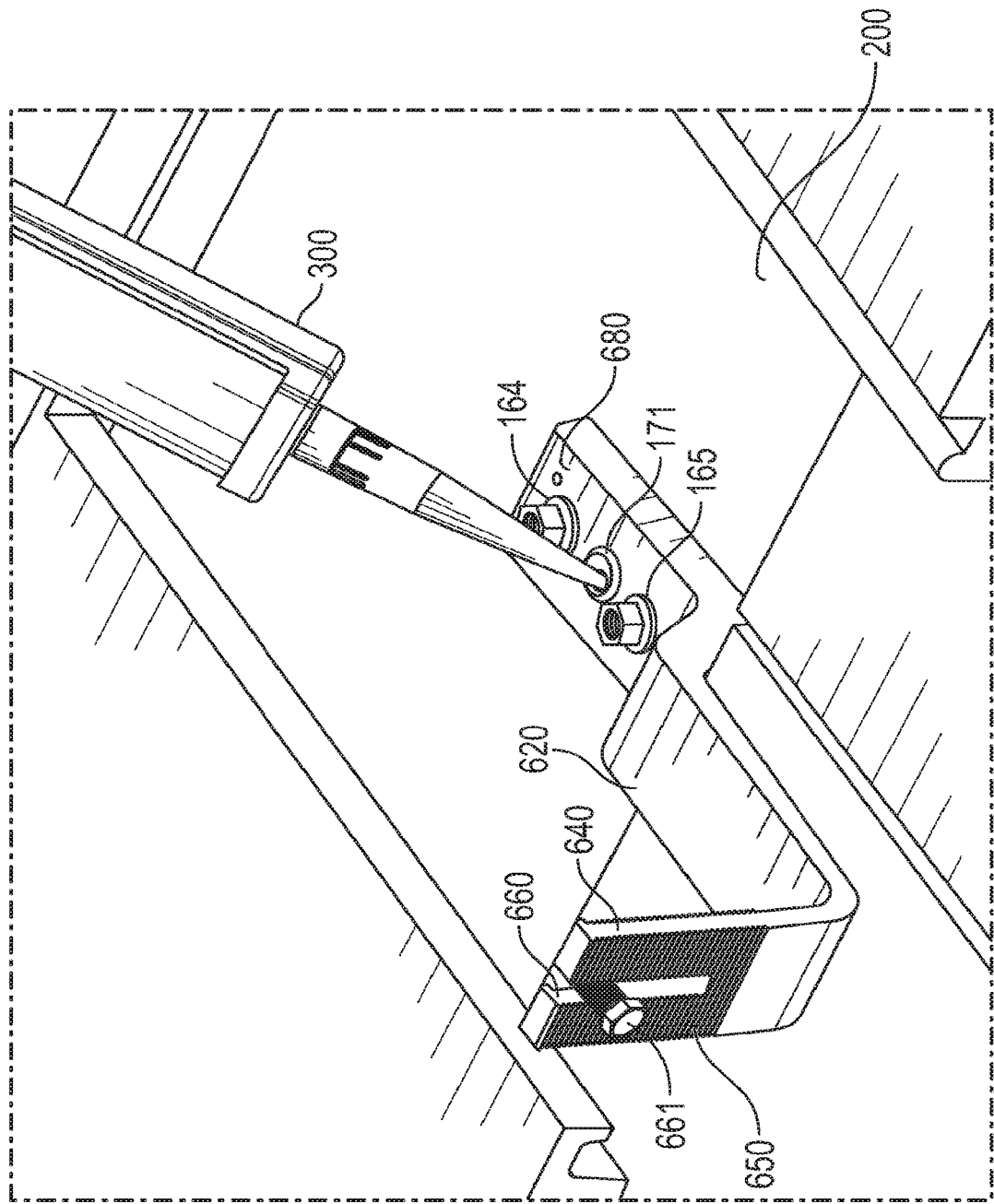
FIG. 52 illustrates a perspective view of the sealant gun applying sealant into a port hole of the embodiment shown in FIG. 49.

Another exemplary embodiment is shown in FIGS. 49-52 and is a variation on the tile hook attachment mount embodiment shown in FIGS. 12 and 13 and utilizes the same securing structure as the mount described in FIGS. 34-42. Instead of using bolts 630 to secure the tile hook attachment mount 600 to the roof 200, the embodiment employs a pair of anchor bolts 162 with grommets 163. As described in the mount 100 in FIGS. 34-42, the anchor bolt 162 is installed by inserting the second leg of the anchor bolts 162 into a pair of pilot holes 210 on the roof 200 so that the inserted legs are positioned generally parallel to, and beneath the roof 200 with the grommets 163 being firmly secured within the pilot holes 210 as shown in FIGS. 50 and 51. Once installed, the threaded legs of the anchor bolts 162 are exposed and firmly positioned to receive base 610 of the mount 600 through openings 666.

Referring to FIGS. 49-50, and the exploded view of FIG. 51, the mount 600 is secured by affixing nuts 164 on the threaded legs of the anchor bolts 162 over optional washers 165. The base 610 also includes the modified port hole 171 and vent hole 680 that are both coupled to cavity 627. The cavity 627 also includes further comprises a pair of sealant guides 628. Each sealant guide 628 is a vertical barrier that extends downward from the upper wall of the cavity 627 and ends slightly above the bottom of the mount 600. Each of the guides 628 form a channel 632 and two outer chambers 633 that are interconnected with each other within the cavity 627. The outer chambers 633 are coupled to the vent hole 680 respectively and are designed to provide a more uniform distribution of sealant as it is inserted from the sealant gun 300 into the port hole 171. The channel 632 is coupled to the sealant port hole 171 and is configured to directly receive sealant from the sealant gun 300. As the sealant is inserted into, and begins filling the channel 632, the guides 628 serve to uniformly direct the sealant into each of the outer chambers 633. When the outer chambers 633 become filled with sealant, the sealant will begin to evacuate from the vent hole 180 and give visual notice that the entire cavity 627 is filled. An optional seal 627 is also included. The seal 629 includes a plurality of ribs 629A that provide added sealing capability to prevent sealant leaks under pressure. The ribs 629A can be solid or flexible depending on the needs of the installer. A standard bolt 661 is typically inserted into the aperture 660 and can secure other objects to the of the U-shaped guide 640 with a standard nut 167 and washer 168 combination. The cross-sectional view in FIG. 50 illustrates the final installation in more detail.

Figure 53:
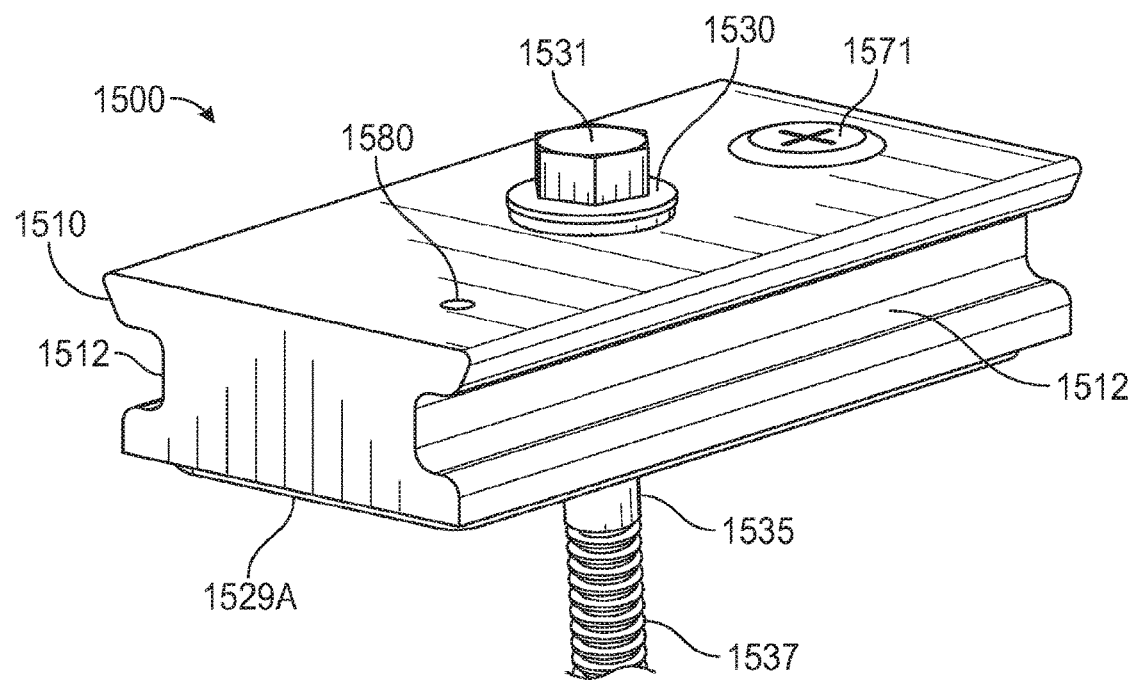
FIG. 53 illustrates a perspective view of an alternate embodiment of a solar panel rail guide.
Figure 54:
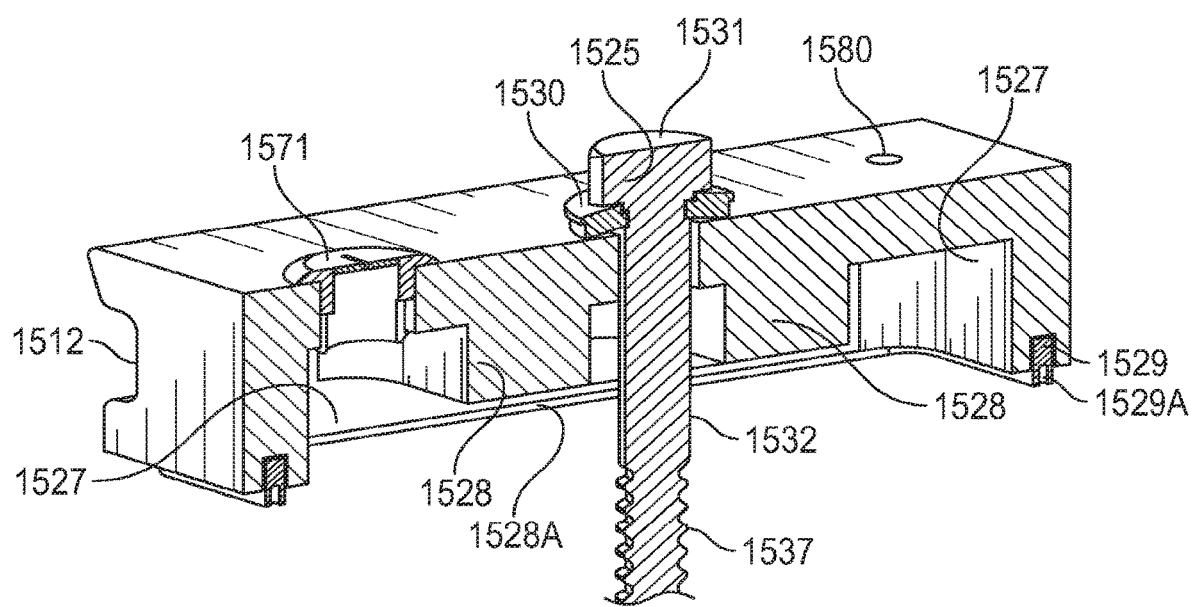
FIG. 54 illustrates a cross-sectional perspective view of the solar panel rail guide of FIG. 53.

Another exemplary embodiment is shown in FIGS. 53 and 54 and is a rail guide mount 1500. The rail guide mount 1500 includes a base 1510 that conforms to the shape of the roof 200, is rectangularly shaped, and includes a pair of guides 1512 on opposing sides of the length of the base 1510. These guides 1512 include grooves 1513 that conform to the shape of an end of a bracket (not shown) that can be coupled within the grooves 1513 and support a solar panel bracket (also not shown). The base 1510 also comprises an opening 1525 for receiving a bolt 1531. The bolt 1531 includes a shaft 1532 and the shaft 1532 has a threaded portion 1537 that secures the mount 1500 to a roof 200. The bolt 1531 also includes a washer 1530 to provide a sealing mechanism over the opening 1525. The bolt 1531 passes through cavity 1527, which encompasses the inner volume of the base 1510. As described in previously discussed embodiments, a port hole 1571 and a vent hole 1580 are located on the top side of the base 1510 and are coupled to the cavity 1527. The port hole 1571 and vent 1580 are generally located on opposite sides of the base 1510. The portions of the cavity 1571 that are coupled to the port hole 1571 and vent 1580 are separated by a pair of sealant guides 1528. The sealant guides enable sealant to enter the port hole 1571 when inserted with the sealant gun 300 and distribute the sealant in a more evenly fashion by filling the chamber of the cavity 1527 nearer to the port hole 1571 first, and then progressively filling the chamber beneath and within the portion 1528A of the cavity 1527 beneath the sealant guides 1528, and then moving toward the chamber near the vent 1580 before it begins to escape through the vent 1580. The perimeter of the base 1510 includes an optional seal 1529. The seal includes a plurality of ribs 1529A that provide added sealing capability to prevent sealant leaks under pressure. The ribs 1529A can be solid or flexible depending on the needs of the installer.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A mounting device comprising:
   a base having an internal cavity, a top, and an open bottom in communication with the internal cavity;
   a first upper member above the base, wherein the first upper member is monolithically formed with the base and extends upwardly from the base;
   a second upper member above the base, wherein the second upper member is monolithically formed with the base and extends upwardly from the base; and
   a fastener opening formed through the base for receiving a fastener when the mounting device is secured to a roof, the fastener opening in communication with the internal cavity.

2. The mounting device of claim 1, further comprising a port formed through the base and in communication with the internal cavity.

3. The mounting device of claim 1, further comprising a vent formed through the base and in communication with the internal cavity.

4. The mounting device of claim 3, further comprising a port formed through the base and in communication with the internal cavity, wherein the port and the vent flank the fastener opening.

5. The mounting device of claim 1, wherein the base and the first and second upper members cooperate to form a guide for holding an object therein.

6. The mounting device of claim 1, wherein at least one of the first and second upper members includes an aperture used for securing an object between the first and second upper members.

7. The mounting device of claim 1, further comprising:
   a guide bound by the first and second upper members;
   an aperture in one of the first and second upper members; and
   a securing fastener applicable to the aperture for securing an object in the guide.

8. The mounting device of claim 1, wherein, when the fastener is received by the fastener opening and the mounting device is secured to the roof, the fastener is seated against the base.

9. A mounting device comprising:
   a base having an internal cavity bound by an inner surface of the base, the base extending from a bottom perimeter to a top, and the base having an open bottom in communication with the internal cavity;
   a first upper member above the base and monolithically formed with the base, wherein the first upper member extends from the base and defines a first inner face above the base, wherein the first inner face has a first width;
   a second upper member above the base and monolithically formed with the base, wherein the second upper member extends from the base and defines a second inner face above the base, wherein the second inner face has a second width; and
   the open bottom of the base has a dimension parallel to the first and second widths which is greater than at least one of the first and second widths.

10. The mounting device of claim 9, further comprising a port formed through the base and in communication with the internal cavity.

11. The mounting device of claim 9, further comprising a vent formed through the base and in communication with the internal cavity.

12. The mounting device of claim 11, further comprising:
   a fastener opening formed through the base for receiving a fastener when the mounting device is secured to a roof, the fastener opening in communication with the internal cavity; and
   a port formed through the base and in communication with the internal cavity;
   wherein the port and the vent flank the fastener opening.

13. The mounting device of claim 9, further comprising:
   a guide bound by the first and second upper members;
   an aperture in one of the first and second upper members; and
   a securing fastener applicable to the aperture for securing an object in the guide.

14. The mounting device of claim 9, further comprising a fastener opening formed through the base for receiving a fastener, the fastener opening in communication with the internal cavity, such that, when the fastener is received by the fastener opening and the mounting device is secured to a roof, the fastener is seated against the top of the base.

15. A mounting device comprising:
   a base having an internal cavity, a top, and an open bottom in communication with the internal cavity;
   opposed upper support members above the base and monolithically formed with the base, cooperatively flanking a guide above the base, wherein the guide is configured to receive an object held between the upper support members; and a fastener opening through the base for receiving a fastener when the mounting device is secured to a roof, the fastener opening in communication with the internal cavity.

16. The mounting device of claim 15, wherein the base tapers inwardly from the open bottom to the top.

17. The mounting device of claim 15, wherein the internal cavity extends upwardly above the fastener opening.

18. The mounting device of claim 15, further comprising a port formed through the base and in communication with the internal cavity.

19. The mounting device of claim 18, further comprising a vent formed through the base and in communication with the internal cavity.

20. The mounting device of claim 19, wherein the port and the vent flank the fastener opening.

21. The mounting device of claim 19, wherein, when a fastener is received in the fastener opening, the fastener is disposed between the port and the vent.

22. The mounting device of claim 15, wherein the base cooperates with the upper support members to form the guide for holding the object therein.

23. The mounting device of claim 15, wherein each of the upper support members includes an aperture formed through the respective upper support member distal to the base, and the apertures are each oriented to receive a common securing fastener therethrough.

24. The mounting device of claim 15, wherein the fastener opening is disposed between and flanked by the upper support members.

25. A mounting device comprising:
a base having an internal cavity, a top, and an open bottom in communication with the internal cavity;
opposed sides of the base extending upwardly above the base to define opposed upper support members cooperatively flanking a guide above the top of the base and monolithically formed with the base, wherein the guide is configured to receive an object held between the upper support members; and
a fastener opening through the base for receiving a fastener when the mounting device is secured to a roof, the fastener opening in communication with the internal cavity.

26. The mounting device of claim 25, further comprising a port formed through the base and in communication with the internal cavity.

27. The mounting device of claim 26, further comprising a vent formed through the base and in communication with the internal cavity, wherein the port and the vent flank the fastener opening.

28. The mounting device of claim 25, further comprising:
an aperture in one of the first and second upper members; and
a securing fastener applicable to the aperture for securing an object in the guide.

29. A mounting device comprising:
a base having an internal cavity, a top, and an open bottom in communication with the internal cavity;
opposed upper support members above the base and monolithically formed with the base, cooperatively flanking a guide above the base, wherein the guide is configured to receive an object held between the upper support members and over the base; and
the base extends outward beyond each of the upper support members.

30. The mounting device of claim 29, further comprising a port formed through the base and in communication with the internal cavity.

31. The mounting device of claim 30, further comprising a vent formed through the base and in communication with the internal cavity.

32. The mounting device of claim 29, further comprising a fastener opening formed through the base for receiving a fastener, the fastener opening in communication with the internal cavity, such that, when the fastener is received by the fastener opening and the mounting device is secured to a roof, the fastener is seated against the top of the base.

* * * * *